(12) United States Patent
Smetana et al.

(10) Patent No.: US 10,752,753 B2
(45) Date of Patent: Aug. 25, 2020

(54) FLAME-RETARDANT COMPOSITIONS AND RELATED METHODS

(71) Applicants: David Smetana, North Canton, OH (US); Mary E. Zink, Cleveland, OH (US)

(72) Inventors: David Smetana, North Canton, OH (US); Mary E. Zink, Cleveland, OH (US)

( * ) Notice: Subject to any disclaimer, the term of this patent is extended or adjusted under 35 U.S.C. 154(b) by 0 days.

(21) Appl. No.: 14/924,212

(22) Filed: Oct. 27, 2015

(65) Prior Publication Data
US 2016/0115299 A1   Apr. 28, 2016

Related U.S. Application Data

(60) Provisional application No. 62/068,814, filed on Oct. 27, 2014.

(51) Int. Cl.
| | |
|---|---|
| *C08K 5/549* | (2006.01) |
| *C08K 5/3492* | (2006.01) |
| *C08K 5/529* | (2006.01) |
| *C08K 5/42* | (2006.01) |
| *C08K 3/22* | (2006.01) |
| *C08K 5/11* | (2006.01) |
| *C08L 69/00* | (2006.01) |
| *C08K 3/36* | (2006.01) |
| *C08K 5/5419* | (2006.01) |
| *C08K 3/34* | (2006.01) |

(52) U.S. Cl.
CPC ............... *C08K 5/549* (2013.01); *C08K 3/22* (2013.01); *C08K 3/34* (2013.01); *C08K 3/36* (2013.01); *C08K 5/11* (2013.01); *C08K 5/34924* (2013.01); *C08K 5/42* (2013.01); *C08K 5/529* (2013.01); *C08K 5/5419* (2013.01); *C08L 69/00* (2013.01); *C08K 2003/2227* (2013.01)

(58) Field of Classification Search
CPC ... C08L 69/00; C08K 5/3492; C08K 5/34924; C08K 5/529; C08K 3/34; C08K 3/36; C08K 5/549; C08K 5/5419
See application file for complete search history.

(56) References Cited

U.S. PATENT DOCUMENTS

| | | | | |
|---|---|---|---|---|
| 6,518,357 | B1 * | 2/2003 | Rajagopalan | C08L 69/00 524/161 |
| 2009/0068363 | A1 * | 3/2009 | Smetana | B82Y 30/00 427/316 |
| 2009/0258977 | A1 * | 10/2009 | Smetana | C08J 3/203 524/100 |
| 2010/0069543 | A1 * | 3/2010 | Monden | C08K 5/42 524/161 |
| 2010/0144939 | A1 * | 6/2010 | Okada | C08L 69/00 524/161 |

FOREIGN PATENT DOCUMENTS

| | | | |
|---|---|---|---|
| CN | 101519529 A | * | 9/2009 |
| JP | 2006169451 A | * | 6/2006 |

OTHER PUBLICATIONS

Machine translated English language equivalent of JP 2006-169451 (Jun. 2006, 15 pages).*
EcoFlame S-338 (Potassium Perfluorobutanesulfonate). UniBrom Corp. 2017, 2 pages.*
Machine translated English language equivalent of CN 101519529 (Sep. 2009, 5 pages).*
ProQuest Machine translation of CN 101519529 (2009, 4 pages).*
Google translation of section regarding flame retardants in CN 101519529 (2018, 2 pages).*
Human translation of CN 101519529 (2018, 23 pages).*

* cited by examiner

*Primary Examiner* — Brieann R Johnston
(74) *Attorney, Agent, or Firm* — Black, McCuskey, Souers & Arbaugh, LPA

(57) ABSTRACT

A composition having a polycarbonate or polycarbonate-copolymer component having a glass transition temperature of at least 120° C., and an additive component having the following elements: i) a mixture of saturated and unsaturated fatty esters, a mixture of organic fatty amides with surfactants, a polyhedral oligomeric silsesquioxane or a mixture of one or more polyhedral oligomeric silsequioxanes, or a combination thereof; ii) inorganic particulates with average particle sizes of less than 100 nm; iii) a high molecular weight, low volatility primary antioxidant; iv) a high molecular weight, low volatility secondary antioxidant; and v) a non-halogenated fire retardant or a mixture of one or more non-halogenated fire retardants.

8 Claims, 17 Drawing Sheets

FLAME-RETARDANT COMPOSITIONS AND RELATED METHODS

CROSS REFERENCE TO RELATED APPLICATIONS

This U.S. non-provisional patent application claims priority to U.S. provisional patent-application Ser. No. 62/068,814 filed on Oct. 27, 2014. All of the subject matter disclosed in U.S. provisional patent application Ser. No. 62/068,814 is hereby incorporated by reference.

BACKGROUND OF THE INVENTION

Flame-retardant compositions are known, and there remains a need for more.

There is a growing demand in the electrical and lighting industry for high-temperature, optically clear, non-halogenated polycarbonates that have UL 94 V1, V2, or VO ratings or better in thin sections and that have glass-transition temperatures of 120° C. to 300° C. and operating temperatures in excess of 120° C. It is also desirable to reduce processing temperatures to provide for better optical clarity, less yellowing, and less thermal degradation. It is also desirable to reduce molding-cycle times because reduced-cycle times are more economical as production yields of molded parts increase. It is also desirable that the polycarbonate compositions have excellent hydraulic, thermal, and oxidative resistance.

BRIEF SUMMARY OF THE INVENTION

A composition having a polycarbonate or polycarbonate-copolymer component having a glass transition temperature of at least 120° C., and an additive component having the following elements: i) a mixture of saturated and unsaturated fatty esters, a mixture of organic fatty amides with surfactants, a polyhedral oligomeric silsesquioxane or a mixture of one or more polyhedral oligomeric silsequioxanes, or a combination thereof; ii) inorganic particulates with average particle sizes of less than 100 nm; iii) a high molecular weight, low volatility primary antioxidant; iv) a high molecular weight, low volatility secondary antioxidant; and v) a non-halogenated fire retardant or a mixture of one or more non-halogenated fire retardants.

DETAILED DESCRIPTION OF THE INVENTION

Figure 1:
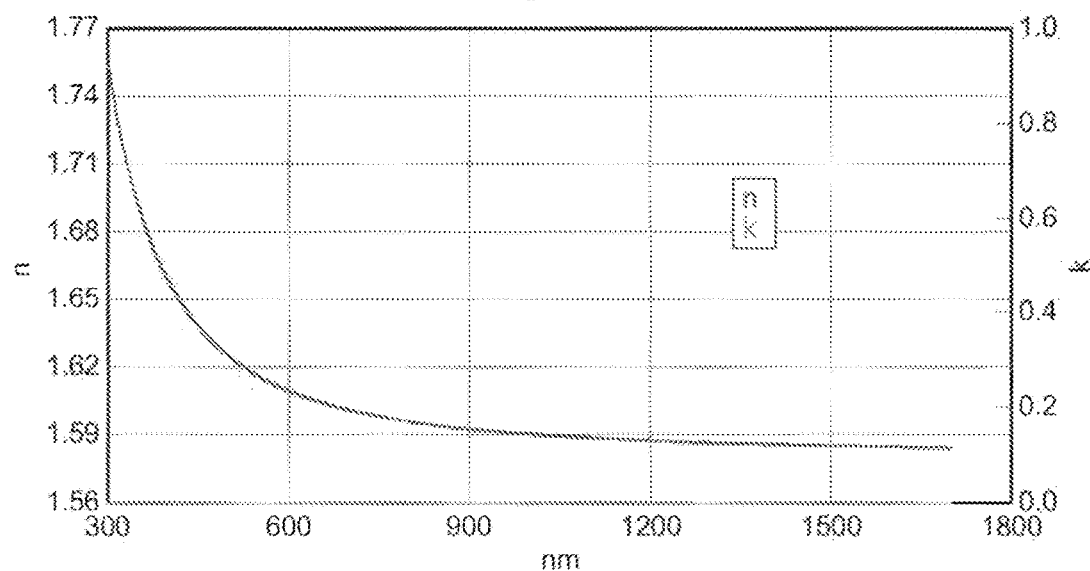
FIG. 1 is refractive-index data of an embodiment.

Generally provided are embodiments directed to flame-retardant compositions and related methods.

A dye concentrate may be made by mixing and optionally grinding the materials selected for use in the dye concentrate. An example of a dye concentrate which may be a homogenous, free-flowing, dry powder is shown in Table 1.

TABLE 1

| Material: | % by Weight of Total Dye Concentrate Formula: |
|---|---|
| (1) mixture of saturated and unsaturated fatty esters; or (2) mixture of organic fatty amides with surfactants; or a mixture of (1) and (2) | 98.4-99.7 |
| High temperature stable blue dye/dry powder | 0.05-0.3 |
| High temperature stable violet dye/dry powder | 0.05-0.3 |
| Inorganic particulate solids with average particle size <100 nm. | 0.05-1.0 |

In one embodiment, the dye concentrate may have a formula set forth in Table 2.

TABLE 2

| Material: | % by Weight of Total Dye Concentrate Formula: |
|---|---|
| (1) Mixture of saturated and unsaturated fatty esters; or (2) mixture of organic fatty amides with surfactants; or a mixture of both (1) and (2) | 99.4 |
| High temperature stable blue dye/dry powder | 0.2 |
| High temperature stable violet dye/dry powder | 0.2 |
| Inorganic particulates with average particle size <100 nm | 0.2 |

The dye concentrate may be made in the form of a homogenous paste. An example of a homogenous paste concentrate is shown in Table 3.

TABLE 3

| Material: | % by Weight of Total Dye Concentrate Formula: |
|---|---|
| Titanate or zirconate liquid | 98.4-99.7 |
| High temperature stable blue dye/dry powder | 0.05-0.3 |
| High temperature stable violet dye/dry powder | 0.05-0.3 |

TABLE 3-continued

| Material: | % by Weight of Total Dye Concentrate Formula: |
|---|---|
| Inorganic particulate solids with average particle size <100 nm. | 0.1-1.0 |

In one embodiment, the dye concentrate may have the formula set forth in Table 4.

TABLE 4

| Material: | % by Weight of Total Dye Concentrate Formula: |
|---|---|
| Titanate or zirconate liquid | 99.4 |
| High temperature stable blue dye/dry powder | 0.2 |
| High temperature stable violet dye/dry powder | 0.2 |
| Inorganic particulates with average particle size <100 nm | 0.2 |

In one embodiment, the additive composition may be a homogenous, free-flowing, dry-power additive composition having the formula shown in Table 5.

TABLE 5

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility secondary antioxidant | .1-50 |

In another embodiment, the additive composition may be a homogenous, free-flowing, dry-power additive composition having the formula shown in Table 5.

TABLE 5A

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility secondary antioxidant | .1-50 |
| Dye Concentrate/dry powder | 0.1-10 |

In another embodiment, the additive composition may be a homogenous, free-flowing, dry-power additive composition having the formula shown in Table 5B.

TABLE 5B

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility primary antioxidant | 0.1-30 |
| High molecular weight, low volatility secondary antioxidant | .1-50 |

In another embodiment, the additive composition may be a homogenous, free-flowing, dry-power additive composition having the formula shown in Table 5C.

TABLE 5C

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility primary antioxidant | 0.1-30 |
| High molecular weight, low volatility secondary antioxidant | .1-50 |
| Dye Concentrate/dry powder | 0.1-10 |

In another embodiment, the additive composition may be a homogenous, free-flowing, dry-power additive composition having the formula shown in Table 5D.

TABLE 5D

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility secondary antioxidant | .1-50 |
| Non-halogenated fire retardant or a mixture of one or more Non-halogenated fire retardants | .01-25 |

In another embodiment, the additive composition may be a homogenous, free-flowing, dry-power additive composition having the formula shown in Table 5E.

TABLE 5E

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |

TABLE 5E-continued

| Material: | % by Weight of Total Additive Composition: |
|---|---|
| High molecular weight, low volatility primary antioxidant | 0.1-30 |
| High molecular weight, low volatility secondary antioxidant | .1-50 |
| Non-halogenated fire retardant or a mixture of one or more Non-halogenated fire retardants | .01-25 |

In another embodiment, the additive composition may be a homogenous, free-flowing, dry-power additive composition having the formula shown in Table 5F.

TABLE 5F

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility secondary antioxidant | .1-50 |
| Non-halogenated fire retardant or a mixture of one or more Non-halogenated fire retardants | .01-25 |
| Dye Concentrate/dry powder | 1-10 |

In another embodiment, the additive composition may be a homogenous, free-flowing, dry-power additive composition having the formula shown in Table 5G.

TABLE 5G

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility primary antioxidant | 0.1-30 |
| High molecular weight, low volatility secondary antioxidant | .1-50 |
| Non-halogenated fire retardant or a mixture of one or more Non-halogenated fire retardants | .01-25 |
| Dye Concentrate/dry powder | .1-10 |

In another embodiment, the additive composition may be a homogenous, free-flowing, dry-power additive composition having the formula shown in Table 5H.

TABLE 5H

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |

TABLE 5H-continued

| Material: | % by Weight of Total Additive Composition: |
|---|---|
| High molecular weight, low volatility secondary antioxidant | .1-50 |
| (1) Mixture of one or more thermally stable antihydrolysis agents; or (2) mixture of one or more UV (ultra-violet) light stabilizers; or a mixture of (1) or (2). | .1-10 |

In another embodiment, the additive composition may be a homogenous, free-flowing, dry-power additive composition having the formula shown in Table 5I.

TABLE 5I

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility primary antioxidant | 0.1-30 |
| High molecular weight, low volatility secondary antioxidant | .1-50 |
| Mixture of one or more thermally stable antihydrolysis agents; or (2) mixture of one or more UV (ultra-violet) light stabilizers; or a mixture of (1) or (2). | .1-10 |

In another embodiment, the additive composition may be a homogenous, free-flowing, dry-power additive composition having the formula shown in Table 5J.

TABLE 5J

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility secondary antioxidant | .1-50 |
| Thermally stable antihydrolysis agent | .1-10 |
| Dye Concentrate/dry powder | .1-10 |
| Mixture of one or more thermally stable antihydrolysis agents; or (2) mixture of one or more UV (ultra-violet) light stabilizers; or a mixture of (1) or (2). | .1-10 |

In another embodiment, the additive composition may be a homogenous, free-flowing, dry-power additive composition having the formula shown in Table 5K.

TABLE 5K

| Material: | % by Weight of Total Additive Composition: |
|---|---|
| (1) Mixture of saturated and unsaturated fatty esters; or (2) mixture of organic fatty amides with surfactants; or | 30-99 |

TABLE 5K-continued

| Material: | % by Weight of Total Additive Composition: |
|---|---|
| (3) mixture of polyhedral oligomeric silsesquioxanes; or a mixture of (1) or (2) or (3) | |
| Inorganic particulates with average particle size <100 nm/dry powder | 0.1-30 |
| High molecular weight, low volatility primary antioxidant | 0.1-30 |
| High molecular weight, low volatility secondary antioxidant | .1-50 |
| Thermally stable antihydrolysis agent Dye Concentrate/dry powder | .1-10 |
| Mixture of one or more thermally stable antihydrolysis agents; or (2) mixture of one or more UV (ultra-violet) light stabilizers; or a mixture of (1) or (2). | .1-10 |

In another embodiment, the additive composition may be a homogenous, free-flowing, dry-power additive composition having the formula shown in Table 5L.

TABLE 5L

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility secondary antioxidant | .1-50 |
| (1) Mixture of one or more thermally stable antihydrolysis agents; or (2) mixture of one or more UV (ultra-violet) light stabilizers; or a mixture of (1) or (2). | .1-10 |
| Non-halogenated fire retardant or a mixture of one or more Non-halogenated fire retardants | .01-25 |

In another embodiment, the additive composition may be a homogenous, free-flowing, dry-power additive composition having the formula shown in Table 5M.

TABLE 5M

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility primary antioxidant | 0.1-30 |
| High molecular weight, low volatility secondary antioxidant | .1-50 |
| Mixture of one or more thermally stable antihydrolysis agents; or (2) mixture of one or more UV (ultra-violet) light stabilizers; or a mixture of (1) or (2). | .1-10 |
| Non-halogenated fire retardant or a mixture of one or more Non-halogenated fire retardants | .01-25 |

In another embodiment, the additive composition may be a homogenous, free-flowing, dry-power additive composition having the formula shown in Table 5N.

TABLE 5N

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility secondary antioxidant | .1-50 |
| Thermally stable antihydrolysis agent | .1-10 |
| Dye Concentrate/dry powder | .1-10 |
| Mixture of one or more thermally stable antihydrolysis agents; or (2) mixture of one or more UV (ultra-violet) light stabilizers; or a mixture of (1) or (2). | .1-10 |
| Non-halogenated fire retardant or a mixture of one or more Non-halogenated fire retardants | .01-25 |

In another embodiment, the additive composition may be a homogenous, free-flowing, dry-power additive composition having the formula shown in Table 5O.

TABLE 5O

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 30-99 |
| Inorganic particulates with average particle size <100 nm/dry powder | 0.1-30 |
| High molecular weight, low volatility primary antioxidant | 0.1-30 |
| High molecular weight, low volatility secondary antioxidant | .1-50 |
| Thermally stable antihydrolysis agent Dye Concentrate/dry powder | .1-10 |
| Mixture of one or more thermally stable antihydrolysis agents; or (2) mixture of one or more UV (ultra-violet) light stabilizers; or a mixture of (1) or (2). | .1-10 |
| Non-halogenated fire retardant or a mixture of one or more Non-halogenated fire retardants | .01-25 |

Examples of non-limiting embodiments of suitable additive compositions are shown in Tables 6-13. The additive compositions may be suitable for use in making, for example, high temperature, optically transparent and/or infrared transparent thermoplastic composites for use in applications, such as lenses for lighting and electronic applications, where the molded lens composite, or molded article, or solvent cast film is capable of achieving a UL 94 VI rating or better at thicknesses of 0.5 to 3.0 mm or thicker.

TABLE 6

| Material: | % by Weight of Total Additive Composition: |
|---|---|
| (1) Mixture of saturated and unsaturated fatty esters; or (2) mixture of organic fatty amides with surfactants; or a mixture of (1) and (2) | 82.98 |

TABLE 6-continued

| Material: | % by Weight of Total Additive Composition: |
|---|---|
| Dye Concentrate/dry powder | 2.0 |
| Inorganic particulates with average particle size <100 nm | 0.86 |
| High molecular weight, low volatility primary antioxidant | 14.16 |
| Total | 100 |

TABLE 7

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 52 |
| Dye Concentrate/dry powder | 2 |
| Inorganic particulates with average particle size <100 nm | 6 |
| High molecular weight, low volatility primary antioxidant | 8 |
| High molecular weight, low volatility secondary antioxidant | 32 |
| Total | 100 |

TABLE 8

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 50.6 |
| Dye Concentrate/dry powder | 2 |
| Inorganic particulates with average particle size <100 nm | 6 |
| High molecular weight, low volatility primary antioxidant | 6 |
| High molecular weight, low volatility secondary antioxidant | 27.4 |
| UV (ultra-violet) Light Stabilizer | 8 |
| Total | 100 |

TABLE 9

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 50.6 |
| Dye Concentrate/dry powder | 1 |
| Inorganic particulates with average particle size <100 nm | 6 |
| Antihydrolysis agent: (1) polymeric carbodiimide; or (2) calcined alumina oxide particulates; or a mixture of (1) and (2) | 12 |
| High molecular weight, low volatility secondary antioxidant | 24.4 |
| UV (ultra-violet) Light Stabilizer | 6 |
| Total | 100 |

TABLE 10

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 52 |
| Dye Concentrate/dry powder | 2 |
| Inorganic particulates with average particle size <100 nm | 6 |
| High molecular weight, low volatility primary antioxidant | 8 |
| High molecular weight, low volatility secondary antioxidant | 32 |
| Total | 100 |

TABLE 11

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 52 |
| Dye Concentrate/dry powder | 2 |
| Inorganic particulates with average particle size <100 nm | 6 |
| Non-halogenated flame retardant | 4 |
| High molecular weight, low volatility primary antioxidant | 8 |
| High molecular weight, low volatility secondary antioxidant | 28 |
| Total | 100 |

TABLE 12

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 88 |
| Dye Concentrate/dry powder | 1 |
| Inorganic particulates with average particle size <100 nm | 3 |
| High molecular weight, low volatility primary antioxidant | 2.2 |
| High molecular weight, low volatility secondary antioxidant | 5.8 |
| Total | 100 |

TABLE 13

| Material: | % by Weight of Total Additive Composition: |
|---|---|
| (1) Mixture of saturated and unsaturated fatty esters; or (2) mixture of organic fatty amides with surfactants; or (3) mixture of polyhedral oligomeric silsesquioxanes; or a mixture of (1) or (2) or (3) | 88 |
| Dye Concentrate/dry powder | 1 |
| Inorganic particulates with average particle size <100 nm | 3.0 |

TABLE 13-continued

| Material: | % by Weight of Total Additive Composition: |
|---|---|
| Non-halogenated flame retardant | 0.3 |
| High molecular weight, low volatility primary antioxidant | 2.3 |
| High molecular weight, low volatility secondary antioxidant | 5.4 |
| Total | 100 |

In one embodiment, the thermoplastic composition may be a composition having a formula shown in Table 14.

TABLE 14

| Material Composition | Material % by Weight of Total Thermoplastic | | | | |
|---|---|---|---|---|---|
| Additive Compositions form Tables 5-5E (wt %) | Table 5 | Table 5B | Table 5C | Table 5D | Table 5E |
| Additive Composition (wt %) | 0.1-12.0 | 0.1-12.0 | 0.1-12.0 | 0.1-12.0 | 0.1-12.0 |
| Thermoplastic Resin or Thermoplastic Copolymer resin (wt %) | 88-99.5 | 88-99.5 | 88-99.5 | 88-99.5 | 88-99.5 |

In another embodiment, the thermoplastic composition may be a composition having a formula shown in Table 14A.

TABLE 14A

| Material Composition Additive Compositions | Material % by Weight of Total Thermoplastic | | | | |
|---|---|---|---|---|---|
| form Tables 5D-5J (wt %) | Table 5F | Table 5G | Table 5H | Table 5I | Table 5J |
| Additive Composition (wt %) | 0.1-12.0 | 0.1-12.0 | 0.1-12.0 | 0.1-12.0 | 0.1-12.0 |
| Thermoplastic Resin or Thermoplastic Copolymer resin (wt) % | 88-99.5 | 88-99.5 | 88-99.5 | 88-99.5 | 88-99.5 |

In another embodiment, the thermoplastic composition may be a composition having a formula shown in Table 14B.

TABLE 14B

| Material Composition Additive Compositions | Material % by Weight of Total Thermoplastic | | | | |
|---|---|---|---|---|---|
| form Tables 5K-5O (wt %) | Table 5K | Table 5L | Table 5M | Table 5N | Table 5O |
| Additive Composition (wt %) | 0.1-12.0 | 0.1-12.0 | 0.1-12.0 | 0.1-12.0 | 0.1-12.0 |
| Thermoplastic Resin or Thermoplastic Copolymer resin (wt) % | 88-99.5 | 88-99.5 | 88-99.5 | 88-99.5 | 88-99.5 |

In another embodiment, the thermoplastic composition may be a composition having a formula shown in Table 14C.

TABLE 14C

| Material Composition Additive Compositions | Material % by Weight of Total Thermoplastic | | | | |
|---|---|---|---|---|---|
| form Tables 5-5E (wt %) | Table 5 | Table 5B | Table 5C | Table 5D | Table 5E |
| (1)Alkoxysilane, or (2)Titanate, or (3) Zirconate, or (4) Biphenol, or a mixture of (1), or (2), or (3), or (4) | 0.01-5.0 | | | | |
| Additive Composition (wt %) | 0.1-12.0 | 0.1-12.0 | 0.1-12.0 | 0.1-12.0 | 0.1-12.0 |
| Thermoplastic Resin or Thermoplastic Copolymer resin (wt) % | 88-99.5 | 88-99.5 | 88-99.5 | 88-99.5 | 88-99.5 |

In another embodiment, the thermoplastic composition may be a composition having a formula shown in Table 14D.

TABLE 14D

| Material Composition Additive Compositions | Material % by Weight of Total Thermoplastic | | | | |
|---|---|---|---|---|---|
| form Tables 5F-5J (wt %) | Table 5F | Table 5G | Table 5H | Table 5I | Table 5J |
| (1)Alkoxysilane, or (2)Titanate, or (3) Zirconate, or (4) Biphenol, or a mixture of (1), or (2), or (3), or (4) Additive Composition (wt %) | 0.1-12.0 | 0.1-12.0 | 0.1-12.0 | 0.1-12.0 | 0.1-12.0 |
| Thermoplastic Resin or Thermoplastic Copolymer resin (wt) % | 88-99.5 | 88-99.5 | 88-99.5 | 88-99.5 | 88-99.5 |

In another embodiment, the thermoplastic composition may be a composition having a formula shown in Table 14E.

TABLE 14E

| Material Composition Additive Compositions | Material % by Weight of Total Thermoplastic | | | | |
|---|---|---|---|---|---|
| form Tables 5K-5O (wt %) | Table 5K | Table 5L | Table 5M | Table 5N | Table 5O |
| (1)Alkoxysilane, or (2)Titanate, or (3) Zirconate, or (4) Biphenol, or a mixture of (1), or (2), or (3), or (4) Additive Composition (wt %) | 0.1-12.0 | 0.1-12.0 | 0.1-12.0 | 0.1-12.0 | 0.1-12.0 |
| Thermoplastic Resin or Thermoplastic Copolymer resin (wt) % | 88-99.5 | 88-99.5 | 88-99.5 | 88-99.5 | 88-99.5 |

In a another embodiment, it may be desirable to use a hydrolytically stable phosphite processing stabilizer added to the thermoplastic resin and thermoplastic copolymer resin as shown in Tables 14-14 E at an addition of 01% to 2.0% by weight of processing stabilizer to the total weight of thermoplastic resin and thermoplastic copolymer resin, and preferably between at an addition of 05% to 1.0% by weight of processing stabilizer to the total weight of thermoplastic resin and thermoplastic copolymer resin. The stabilizer can also be blended into the additive compositions listed in Tables 5 through 13 at an amount that would represent the dosage specified for use by weight of the stabilizer to the total weight of the thermoplastic resin or thermoplastic copolymer resin. An example of a suitable processing stabilizer is Irgafos 168, Ciba, Tris(2,4-ditert-butylphenyl) phosphate, a hydrolytically phosphate process stabilizer used as a primary or secondary antioxidant during processing of thermoplastic polymers, such as polycarbonate reacting with hydroperoxides formed by autooxidation of polymers preventing process induced degradation, yellowing, chains scission of the polymers, and molecular weight reduction of the polymers particularly during processing which can be used at 0.01% to 2.0% by weight of stabilizer by total weight of thermoplastic polymer or copolymer. The stabilizer can also be metered directly into any type single or twin screw extruder at the specified dosage during melt extrusion as is well known in the art.

Examples of a non-limiting embodiment is a composition(s):

TABLE 14F

| Material Composition Additive Compositions form | Material % by Weight of Total Thermoplastic | | | | |
|---|---|---|---|---|---|
| Tables 5-5E (wt %) | Table 5 | Table 5B | Table 5C | Table 5D | Table 5E |
| Additive Composition (wt %) | 0.1-12.0 | 0.1-12.0 | 0.1-12.0 | 0.1-12.0 | 0.1-12.0 |
| Thermoplastic Resin or Thermoplastic Copolymer resin (wt %) | 86-99.5 | 86-99.5 | 86-99.5 | 86-99.5 | 86-99.5 |
| Processing stabilizer (ex: Ciba Irgafos 168)(wt %) | 0.01-2.0 | 0.01-2.0 | 0.01-2.0 | 0.01-2.0 | 0.01-2.0 |

Examples of suitable, non-limiting, materials for these purposes are disclosed in Table 15.

TABLE 15

| Material Type & Description: | Example/Function/Source: |
|---|---|
| 1. Mixture of saturated and unsaturated fatty esters; mixture of fatty acids, esters & gycerides, polymers and waxes | INT-40DHT, INT619C, Axel Plastic Research Laboratories, Inc., Woodside, NY; dry powder; internal lubricant, process aid, dispersant for inorganic particulates (e.g., nanomaterials) and other additive materials; hydrophobic; internal mold release; no adverse effect on mechanical properties or secondary operations such as surface coating of the thermoplastic resin; melts @ about 65° C.; thermally stable to about 400° C. |
| 2. Mixture of organic fatty amides and surfactants | INT-33 UDY; Axel Plastic Research Laboratories, Inc., Woodside, NY; dry powder; internal lubricant, process aid, mold release agent; dispersant for inorganic particulates (e.g., nanomaterials) and other additive materials; hydrophobic; no adverse effect on mechanical properties or secondary operations such as surface coatings of the thermoplastic resin; melts @ about 145° C.; thermally stable to about 350° C.; or, alternatively, INT-33 UDS; Axel Plastic Research Laboratories, Inc., Woodside, NY; dry powder; internal lubricant, process aid, mold release agent; dispersant for inorganic particulates (e.g., nanoparticles) and other additive materials; hydrophobic; no adverse effect on mechanical properties or secondary operations such as surface coatings of the thermoplastic resin; melts @ about 145° C.; thermally stable to about 400° C. |
| 3. Titanates and/or zirconates | Titanates and/or zirconate. Alkoxy titanate such as LICA 12 or KR-PRO, from Kenrich Petrochemicals, Inc., Bayonne, NJ, and/or coordinate zirconates such as KZ 55 or KR 55, from Kenrich (KEN-REACT Reference Manual, February, 1985, Kenrich Petrochemicals, Inc.), in liquid or powder form. To create a powder, the liquid titanate or zirconate may be absorbed or adsorbed onto inorganic particulates (e.g., fumed silica or aluminum oxide), in suitable consistency. The titanates LICA 12 or KR-PRO may be thermally stable up to about 350° C. or higher in a polymer matrix. The zirconates KZ-55 or KR 55 may be thermally stable up to about 400° C. in a polymer matrix. The titanates may be internal lubricant, process aid, dispersant and/or coupling agent for inorganic particulates (e.g., nanoparticles) and other additive materials. The titanates and/or zirconates may be hydrophobic. |

TABLE 15-continued

| Material Type & Description: | Example/Function/Source: |
| --- | --- |
| 4. Silsequioxanes, Poly silsesquioxanes, oligomeric silsesquioxanes, Polyhedral Oligomeric Silsesquioxanes | POSS SO1458, tri silanol phenyl poss dry powder; POSS SO1455, tri silanol isooctyl-poss, Hybrid Plastics, Hattiesburb, MS, internal lubricant, process aid, mold release agent; dispersant for inorganic particulates (e.g., nanomaterials) and other additive materials; hydrophobic; no adverse effect on mechanical properties or secondary operations, such as surface coatings of the thermoplastic resin; melts @ about 145° C.; thermally stable to about 390° C. or higher. In one or more embodiments, silsesquioxanes, which may also be referred to as polysilsesquioxanes or oligomeric silsesquioxanes, are materials represented by the formula $[RSiOi\ 5]_\infty$ where $\infty$ represents molar degree of polymerization and R is a monovalent organic group. In one or more embodiments, the monovalent organic group may include a hydrocarbyl group, a hydro carbyloxy group, and a siloxy group.<br>In one or more embodiments, the hydrocarbyl groups include, but are not limited to, alky, cycloalkyl, substituted cycloalkyl, alkenyl, cycloalkenyl, substituted cycloalkenyl, aryl, allyl, substituted aryl, aralkyl, alkaryl, or alkynyl groups. Substituted hydrocarbyl groups include hydrocarbyl groups in which one or more hydrogen atoms have been replaced by a substituent such as an alkyl group. In one or more embodiments, the hydrocarbyl groups may include from one, or the appropriate minimum number of carbon atoms to form the group, to 20 carbon atoms. These hydrocarbyl groups may contain heteroatoms such as , but not limited to, nitrogen, boron, oxygen, silicon, sulfur, and phosphorus atoms.<br>[0017] In one or more embodiments, the hydrocarbyloxy groups include, but are not limited to, alkyoxy, cycloalkyoxy, substituted cycloalkoxy, alkenyloxy, cycloalkenyloxy, substituted cycloalkenyloxy, aryloxy, allyloxy, substituted aryloxy, aralkyloxy, alkaryloxy, or alkynyloxy groups. Substituted hydrocarbyloxy groups include hydrocarbyloxy groups in which one or more hydrogen atoms attached to a carbon atom have been replaced by a substituent such as an alkyl group. In one or more embodiments, the hydrocarbyloxy groups may include from one, or the appropriate minimum number of carbon atoms to form the group, to 20 carbon atoms. The hydrocarbyloxy groups may contain heteroatoms such as, but not limited to nitrogen, boron, oxygen, silicon, sulfur, and phosphorus atoms.<br>The monovalent organic groups (e.g. the hydrocarbyl and hydrocarbyloxy groups) may include heteroatoms such as, but not limited to, oxygen, nitrogen, silicon, sulfur, phosphorus, chlorine, bromine, and fluorine. The heteroatoms may form functionalities such as hydroxyl groups and/or carbonyl groups, which may form ester groups, alcohol groups, acid groups, and ketone groups and acyl groups. Other functionalities include, but are not limited to, amines, ethers, and epoxides.<br>Silsesquioxanes may be either homoleptic or heteroleptic. Homoleptic systems contain only one type of R group while heteroleptic systems contain more than one type of R group. As a special case R may also include fluorinated organic groups. In one or more embodiments, the silsesquioxanes may be defined by the formula $[(RSiOi\ 5)_n]\Sigma\#$ for homoleptic compositions, $[(RSiO\ .5)_n(R'SiOi\ .5)_m]\Sigma\#$ $f^{or}$ heteroleptic compositions (where R ≠ R9, $[(RSiOi5)_m(RXSiOi\ o)m]\Sigma\#$ $f^{or}$ functionalized heteroleptic compositions (where R groups can be equivalent or inequivalent), and $[(SiOi\ 5)_n(RSiO\ o\ m(M)j]\Sigma\#$ for heterofunctionalized heteroleptic compositions. In all of the above R is the same as defined above and X includes but is not limited to OH, Cl, Br, I, alkoxide (OR), acetate (OOCR), peroxide (OOR), amine (NR2), isocyanate (NCO), and R. The symbol M refers to metallic elements within the composition that include high and low Z metals including s and p block |

TABLE 15-continued

| Material Type & Description: | Example/Function/Source: |
|---|---|
| | metals, d and f block transition, lanthanide, actinide metals, in particular, Al, B, Ga, Gd, Ce, W, Ni, Eu, U, Y, Zn, Mn, Os, Ir, Ta, Cd, Cu, Ag, V, As, Tb, In, Ba, Ti, Sm, Sr, Pt, Pb, Lu, Cs, Tl, and Te. The symbols m, n and j refer to the stoichiometry of the composition. The symbol Σ indicates that the composition forms a nanostructure and the symbol # refers to the number of silicon atoms contained within the nanostructure. The value for # is usually the sum of m + n, where n ranges typically from 1 to 24 and m ranges typically from 1 to 12. It should be noted that Σ# is not to be confused as a multiplier for determining stoichiometry, as it merely describes the overall nanostructural characteristics of the system (aka cage size).<br>In one or more embodiments, silsesquioxanes include polyhedral silsesquioxanes, ladder-structured silsesquioxanes, and fully random silsesquioxanes. The polyhedral silsesquioxanes include caged and partial caged structures, the latter of which lacks a complete connection of all units in the cage.<br>In one or more embodiments, the silsesquioxanes employed in practice of the present invention include one or more hydrophobic substituents and one or more hydrophilic substituents.<br>In one or more embodiments, the silsesquioxanes are partial caged structures that may be defined by the formula<br>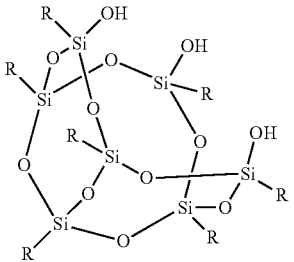<br>where each R is independently a monovalent organic group. These partial caged structures of these embodiments may be referred to as silanols. In particular embodiments, each R is a phenyl group. In other embodiments, each R is a branched alkyl group such as an iso- octyl group.<br>In one or more embodiments, useful silsesquioxanes include 1,3,5,7,9,11,14-heptahydrocarbyltricyclo[7.3.3.1(5,110]heptasiloxane-endo-3,7,14-triols such as, but not limited to, 1,3,5,7,9,11,14-heptaphenyltricyclo[7.3.3.1(5,110]heptasiloxane-endo-3,7,14- trol, 1,3,57,9,11,14-heptaisobutyltricyclo[7.3.3.1[5,110]heptasiloxane-endo-3,7,14-triol, 1,3,57,9,11,14-heptaisooctyltricydo[7.3.3.1(5,110]heptasiloxane-endo-3,7,14-triol, 1,3,5,7,9,11,14-heptaethyltricyclo[7.3.3.1(5,110]heptasiloxane-endo-3,7,14-trol, 1,3,5,7,9,11,14-heptacyclopentyltricyclo[7.3.3.1(5,110]heptasiloxane-endo-3,7,14-triol, and 1,3,5,7,9,11,14-heptacyclohexyltricyclo[7.3.3.1(5,110]heptasiloxane-endo-3,7,14-triol.<br>Useful polyhedral silsesquioxanes include those available under the tradenames Polyhedral Oligomeric Silsequioxane (POSS), Polyhedral Oligometallosesquioxane (POMS), and Polyhedral Oligomeric Silicate (POS) (Hybrid Plastics). Other commericial sources include those available under the tradenames, Janus Cubes, Phenyls, and T-Cages (Mayaterials). Specific examples of useful silsesquioxanes include those available under the tradenames SO1400(trisilanoylcyclohexyl POSS), SO1430 (trisilanolcyclopentyl POSS), SO1440 (disilanolisobutyl POSS), S01444 (trisilanolethyl |

TABLE 15-continued

| Material Type & Description: | Example/Function/Source: |
|---|---|
| | POSS), SO1450 (trisilanolisobutyl POSS), S01455 (trisilanolisooctyl POSS), S01457 (trisilanolphenyl POSS lithium salt), S01458 (trisilanolphenyl POSS), and SO1460 (tetrasilanolphenyl POSS). |
| 5. Hydrolysis Agent | The hydrolysis agent may comprise one polymeric cardiimide or one calcined aluminum oxide, gamma, delta, delta-theta, or alphs phase, or, preferably, a mixture of the two. The cardioomide hydrolysis agent may be Stabaxol P 400 having a thermal stability up to about 350° C. available from Rhein Chemie Corp., Pittsburgh, PA. The calcined aluminum hydrolysis agent may be Puralox K-160, having a primary, crystal particle size of about 5 nm, available from Sasol Corp., Houston, TX; enhances hydrolytic stability and prevents moisture vaporization under high heat. |
| 6. Dye Concentrate/dry powder | HTLT Dye Concentrate; Suncolor Corporation; melts @ 125° C.; thermally stable to over 400° C.; provides consistent, uniform color quality correcting yellow color formation in the host thermoplastic resin; optically clarifying the thermoplastic resin. |
| 6a.. High temperature stable blue dye/dry powder | Amplast Blue R3 or Amplast Blue HB; ColorChem International Corp., Atlanta, GA, insoluble blue dye; melts @ 170° C.; thermally stable to 400° C. particularly when combined with a mixture of saturated and unsaturated fatty esters or amides/dry powder and high temperature resistant, inorganic particulates (e.g., nanomaterials). |
| 6b. High temperature stable violet dye/dry powder | Amplast Violet BV or Amplast Violet PK; ColorChem International Corp., Atlanta, GA, insoluble violet dye; melts @ 170° C.; thermally stable to 400° C. particularly when combined with a mixture of saturated and unsaturated fatty esters or amides/dry powder and high temperature resistant, inorganic particulates (e.g., nanomaterials). |
| 7. Inorganic particulates with average particle size < 100 nm/dry powder | Aluminum Oxide C or AEROXIDE Alu US; Degussa Corporation, Piscataway, NJ; calcined alumina oxide, gamma phase, Puralox K160, Sasol Corp., Houston, TX; average primary particle size less than about 100 nm, and in one embodiment less than about 50 nm; dry powder dispersant and suspension aid; flow aid for thermoplastics; high temperature resistance in excess of 1000° C.; aids in the uniform dispersion of visible light; moisture scavenger. The inorganic particulates may have a relatively high zeta potential. The zeta potential may be at least about +30 mV or more negative than −30 mV, and in one embodiment at least about +35 mV or more negative, then −35 mV. |
| 8. High molecular weight, low volatility primary antioxidant | Cyanox 1790; Cytec Industries, West Paterson, NJ; primary hindered phenolic stabilizer (1,3,5-Tris(4-t-butyl-3-hydroxy-2,6-dimethylbenzyl)s-triazine-2,4,6-(1H,3H,5H)-trione); Mayzo BNX 1010 high molecular weight hindered phenolic antioxidant and MAYZO BNX 1076 sterically hindered phenolic antioxidants melts @ about 160° C.; thermally stable to 400° C. when combined with a mixture of saturated and unsaturated fatty esters or amides/dry powder and high temperature resistant, inorganic particulates (e.g., nanomaterials); reduces or eliminates yellowing of the thermoplastic resin during high temperature processing. |
| 9. High molecular weight, low volatility secondary antioxidant | Doverphos S-9228PC; Dover Chemical Corporation, Dover, OH; solid phosphite antioxidant (Bis (2,4-dicumylphenyl) pentaerythrithol diphosphite); thermally stable to 400° C. when combined with a mixture of saturated and unsaturated fatty esters or amides/dry powder and high temperature resistant, inorganic particulates (e.g., nanomaterials); reduces yellowing of the thermoplastic resin during high temperature processing; melts @ 220-233° C.; provides hydrolytic and thermal stability to the thermoplastic resin and other thermoplastic materials in the additive composition during processing of the thermoplastic resin and provides long term hydrolytic, photolytic, and thermal stability to the molded articles. |
| 10. Fire Retardant Additives and Agents | Potassium Perfluorobutanesulfonate, such as FR2025, 3M Corporation, and other sulfonate salts or in combination with sodium toluenesulfonate |

TABLE 15-continued

| Material Type & Description: | Example/Function/Source: |
|---|---|
| 11. UV (ultra-violet) Light Stabilizer | Hostavin B-CAP; Clariant Corporation, Charlotte, NC; solid Benzylidene Malonate UV Absorber (Tetraethyl 2,2' (1,4-Phenylenedimethylidyne)Bis Malonate); thermally stable to 400° C., for short temperature cycles when combined with thermogravically stable mixture of saturated and unsaturated fatty esters, fatty acids, fatty amides, and high temperature resistant, inorganic nanomaterials; melts @ 137-140° C.; provides hydrolytic and thermal stability to the thermoplastic resin and other thermoplastic materials in the additive composition during processing of the polymer composition and provides long term hydrolytic, photolytic, and thermal stability to the molded articles. |
| 12. Polycarbonate resin | High temperature polycarbonate made from Bisphenol A, and/or Bisphenol M, and Bisphenol TMC, and polycarbonate copolymers made of the same, or any other suitable polycarbonate copolymers described and cited herein including polycarbonates and polycarbonate copolymers having a having a Tg of about 120° C. to 300° C. or higher, for example, LEXAN C893525 polycarbonate and 2-phenyl-3,3-bis(4-hydroxyphenyl)phthalimidine (PPPBP) copolycarbonates with or without a bisphenol A homopolycarbonate having a Tg of about 140 to 200 degrees C, Sabic-IP. |
| 13. Biphenol | 4,4' BIPHENOL, Schenectady International, Schenectady, NY 12301; having a melt temperature greater than 200° C.; as an additive to moderate or increase the refractive index of the thermoplastic resin (e.g., polycarbonate). The biphenol may be used alone or with a compatible catalyst to increase the Tg of the thermoplastic resin. The biphenol may improve the UV light and short visible light resistance of the thermoplastic resin. |
| 14. Other inorganic particulates | Silicon dioxide, silicon, cerium oxide, titanium dioxide, zirconium oxide, and mixtures thereof; mixtures of one or more of the foregoing with aluminum oxide; either as a dry powder or in a solvent suspension (e.g., suspension in toluene); used as a reinforcing agent, dispersing agent, and/or an agent to increase the refractive index and to increase the temperature resistance of the polymer composition. These may be available from Degussa Corporation, Picataway, NJ and Melorium Technologies, Inc., Rochester, NY. The inorganic particulates may have an index of refraction in the range from about 1.0 to about 4.0. The inorganic particulates may have a relatively high zeta potential. The zeta potential may be at least about +30 mV or more negative than −30 mV, and in one embodiment at least about +35 mV or more negative thant −35 mV. |
| 15. Melt processable glass resin | Phosphate glass which may provide the polymer composition with a higher Tg than the Tg of the polymer composition without the phosphate glass and may increase the the temperature resistance, stiffness and modulus of the polymer composition while reducing the shrinkage of the polymer composition upon cooling in the mold and making the molded polymer composition more abrasion resistant. A suitable phosphate glass may be 908YRL, having a Tg of about 309° and a refractive index of about 1.55-1.57, which may be available from Corning. Other suitable phosphate glass compositions are described in U.S. Pat. No. 6,667,258 B2 and U.S. Pat. No. 5,153,151. While it is desirable to match, as closely as possible, the refractive indexes of the polymer and the phosphate glass, it may also be desirable to use a phosphate glass having a higher refractive index than the polymer composition in order to increase the overall refractive index of the polymer composition. |
| 16. Silvane, surface treatments and coupling agents | Silane surface treatments such as Dynasylan OCTEO (octyltriethoxsilane) and surface treatments and functional coupling agents such as Dynasil 9165 (phenyltrimethoxysilane), Dynasil DAMO (N-2-Aminoethyl-3-aminopropyltrimethoxysilane), or mixtures thereof, available from Degussa Corporation, Parsipany, NJ, having high temperature stability |

TABLE 15-continued

| Material Type & Description: | Example/Function/Source: |
|---|---|
| | greater than about 350° C., for treating inorganic particulates and melt processable glass resin to improve dispersion into polymer resin, improve mixing, improve mechanical strength, promote hydrophobicity, and decrease water-vapor transmission. |
| 17. Other internal dispersants, lubicants, and mold release agents, and materials | hydrocarbon agents, such as natural and synthetic paraffins, polyethylene waxes, fluorocarbons, etc., fatty acid agents, such as stearic acid, hydroxystearic acid, other higher fatty acids, hydroxy fatty acids, etc., fatty amide agents, such as stearamide, ethylenebisstearamide, other alkylene bis fatty amides, etc., alchol agents, such as stearyl alcohol, cetyl alcohol, other fatty alcohols, polyhydric alcohols, polyglycols, polyglycerols, etc. fatty acid ester agents, such as butyl stearate, pentaerythritol tetrastearate, other fatty acid esters of lower alcohols, fatty acid esters of polyhydric and monohydric alcohols, fatty acid esters of polyglycols, etc., and silicone mold release agents, such as silicone oils, etc., these agents being thermally stable to about 350° C., and in one embodiment preferably up to about 400° C.; pigments, dyes, optical brighteners, flame retardants, and conductive polymers. |
| 18. Alkoxysilanes as additives for enhancing thermal stability | Phenyltrialkoxysilane such as phenyltrimethoxysilane (Dynasylan 9165) alone or in combination with a diaminotrialkoxysilane such as N-(2-aminoethyl)-3-aminopropyltrimethoxy silane (Dynasylan DAMO). |
| 19. Hydrolytically Stable Phosphite Processing Stabilizer | Irgafos 168, Ciba, Tris(2,4-ditert-butylphenyl)phosphate, a hydrolytically phosphate process stabilizer used as a primary or secondary antioxidant during processing of thermoplastic polymers, such as polycarbonate reacting with hydroperoxides formed by autooxidation of polymers preventing process induced degradation, yellowing, chains scission of the polymers, and molecular weight reduction of the polymers particularly during processing which can be used at .01% to 2.0% by weight of stabilizer by total weight of thermoplastic polymer. |
| 20. Thermoplastics and/or thermoplastic copolymers | Acrylonitrile-Butadiene-Styrene, (ABS), Cellulosic. Ethylene vinyl alcohol, (E/VAL). Fluoroplastics, (PTFE), (FEP, PFA, CTFE, ECTFE, ETFE). Ionomer. Liquid Crystal Polymer, (LCP). Polyacetal, (Acetal). Polyacrylates, (Acrylic). Polyacrylonitrile, (PAN), (Acrylonitrile). Polyamide, (PA), (Nylon). Polyamide-imide, (PAI). Polyaryletherketone, (PAEK), (Ketone). Polybutadiene, (PBD). Polybutylene, (PB). Polycarbonate, (PC). Polyektone, (PK). Polyester. Polyetheretherketone, (PEEK). Polyetherimide, (PEI). Polyethersulfone, (PES). Polyethylene, (PE). Polyethylenechlorinates, (PEC). Polyimide, (PI). Polymethylpentene, (PMP). Polyphenylene Oxide, (PPO). Polyphenylene Sulfide, (PPS). Polyphthalamide, (PTA). Polypropylene, (PP). Polystyrene, (PS). Polysulfone, (PSU). Polyurethane, (PU). Polyvinylchloride, (PVD). Polyvinylidene Chloride, (PVDC). Thermoplastic elastomers, (TPE). |

Example 1

A dye concentrate is prepared by mixing and grinding the materials shown in the following Table 16:

TABLE 16

| Material: Dye Concentrate | % by Weight of Total Dye Concentrate Formula: |
|---|---|
| Mixture of saturated and unsaturated fatty esters; INT-40DHT | 99.4 |
| High temperature stable blue dye/dry powder; Amplast Blue R3 Dye | 0.2 |
| High temperature stable violet dye/dry powder; Amplast Violet BV Dye | 0.2 |
| Inorganic particulates with average particle size <100 nm; Aluminium Oxide C | 0.2 |
| Total | 100 |

An Additive composition is prepared by mixing the foregoing Dye Concentrate composition and the materials listed in the following Table 17 into a free flowing dry powder:

TABLE 17

| Material: Additive Composition | % by Weight of Total Additive Composition: |
|---|---|
| Mixture of saturated and unsaturated fatty esters; INT-40 DHT | 39.2 |
| polyhedral oligomeric silsesquioxanes, POSS SO1458, tri silanol phenyl poss | 23.9 |
| Dye Concentrate; Dye Concentrate Formula from Table 15 | 2.3 |
| Inorganic particulates with average particle size <100 nm; Aluminium Oxide 805 C | 8.4 |
| High molecular weight, low volatility secondary antioxidant; Doverphos S-9228PC, solid phosphite antioxidant (Bis (2,4-dicumylphenyl) pentaerythrithol diphosphite) | 19.6 |
| High molecular weight, low volatility primary antioxidant, Mayzo 1076 | 5.7 |
| High molecular weight, low volatility primary antioxidant, Mayzo 1010 | 0.6 |
| Fire Retardant, Potassium Perfluorobutanesulfonate, FR2025 | 0.3 |
| Total | 100 |

A thermoplastic composition is prepared by mixing the foregoing Additive composition and the materials listed in the following Table 18 into a free flowing dry powder:

TABLE 18

| Material: | % by Weight of Total Additive Composition: |
|---|---|
| Additive Composition of Table 17 | 1.01 |
| Polycarbonate thermoplastic, N C893525 | 98.99 |
| polycarbonate homo-polymer coarse powder having a Tg of about 200 degrees C., | |
| Total | 100 |

Processing of the Foregoing Additive, Polycarbonate Compositions and Molding:

First add the HTLT AA-2 Dye Concentrate to the INT 40-DHT powder, blend for 2 minutes and then blend and ingredients using intergrind the two a grinding action such as a coffee grinder or NINJA type grinder. Nest, add the Doverphos S-9228, the Irganos (or Mayzo) 1076, then the Aeroxide Aluminium Oxide C 805 together and blend for two minutes, then intergrind all of the ingredients together in a NINJA type blender/grinder for 3 minutes. Add and blend 1.01% Additive by total weight of the C893525 Lexan resin when in powder form. The blending can be tumble blending (no grinding) or using a blender such as a Continental Products, ROLLO MIXER-Batch Mixer, Continental products, Wisconsin or similar. This type of blender can be used for any of the formulations combining the Additives disclose herein and the polycarbonate powder resins. The powder composition is then dried at about 130 degrees C. in a vacuum oven for 4 to 6 hours or until the powder has a moisture content of less than 0.02%, and less than 0.01% preferred. The powder composition can be fed into a hopper having a preferred temperature of about 80 degrees C., then directly into a screw injection molding machine and melt processed at about 280 degrees C. to about 310 degrees C., with temperatures of 300 degrees C. preferred, and molded into objects. The processing temperature was reduced from 340 degrees C. or higher required for injection molding the neat C893525 Lexan powder resin. The metal mold temperature can range from 130 degrees C. to 180 degrees C., with a higher temperature preferred. Plaques 2 inches square by 2 mm thick were injection molded. The molding cycle time for molding the plaques was reduced from 29.5 seconds required for molding the neat C893525 Lexan resin. The plaques were optically transparent as further described below.

Alternatively, the Additive composition (above) can be blended into the polycarbonate powder resin and the total blended composition (powder) can be fed into a screw extruder and melt extruded into strands at a temperature of about 275 degrees C. to about 310 degrees C., and the strands chopped into pellets. The pellets are then dried at about 130 degrees C. in a vacuum oven for 4 to 6 hours or until the pellets have a moisture content of less than 0.02%, and less than 0.01% preferred. The pellets can be fed into a hopper having a preferred temperature of about 80 degrees C., then directly into a screw injection molding machine and melt processed at about 280 degrees C. to about 310 degrees C., with temperatures of 300 degrees C. preferred, and molded into objects.

Alternatively, the Additive composition (above) and the polycarbonate powder resin be metered separately into a screw extruder, mixed and melt extruded into strands at a temperature of about 275 degrees C. to about 305 degrees C., and the strands chopped into pellets. The pellets are then dried at about 130 degrees C. in a vacuum oven for 4 to 6 hours or until the pellets have a moisture content of less than 0.02%, and less than 0.01% preferred. The pellets can be fed into a hopper having a preferred temperature of about 80 degrees C., then directly into a screw injection molding machine and melt processed at about 280 degrees C. to about 310 degrees C., with temperatures of 300 degrees C. preferred, and molded into objects. The metal mold temperature can range from 130 degrees C. to 180 degrees C., with a higher temperature preferred.

Alternatively, the Additive composition and the polycarbonate powder resin can be blended together and then formed or pressed into a pellet using a tablet press or similar equipment and processes as described in U.S. Pat. No. 6,544,452. The pellets are then dried at about 130 degrees C. in a vacuum oven for 4 to 6 hours or until the pellets have a moisture content of less than 0.02%, and less than 0.01% preferred. The pellets can be fed into a hopper having a preferred temperature of about 80 degrees C., then directly into a screw injection molding machine and melt processed at about 280 degrees C. to about 310 degrees C., with temperatures of 300 degrees C. preferred, and molded into objects. The metal mold temperature can range from 130 degrees C. to 180 degrees C., with a higher temperature preferred.

Alternatively, if the polycarbonate resin is synthesized and produced as a pellet, the pellets can be warmed to a temperature between 80 degrees C. and 130 degrees C. and the Additive composition can be tumble blended onto and melted onto the surface of the warm pellets forming a coated pellet. The pellets are then dried at about 130 degrees C. in a vacuum oven for 4 to 6 hours or until the pellets have a moisture content of less than 0.02%, and less than 0.01% preferred. The pellets can be fed into a hopper having a preferred temperature of about 80 degrees C., then directly into a screw injection molding machine and melt processed at about 280 degrees C. to about 310 degrees C., with temperatures of 300 degrees C. preferred, and molded into objects. The metal mold temperature can range from 130 degrees C. to 180 degrees C., with a higher temperature preferred.

Any conventional thermoplastic extruders and injection molding machines, including ultrasonic extruders and injection molding machines, can be used for preparing thermoplastic articles from the compositions described herein as long as the novel properties are not diminished as is well known to those skilled in the art. Thermoplastic articles and films made from the compositions described herein can be made by solvent solution casting and processing as is well known to those skilled in the arts.

The thermoplastic composition shown in Table 18 above was dried in a vacuum oven for 6 hours at a temperature of 130 degrees C. The powder composition was injection molded by feeding the dried, coarse powder mixture directly into the injection molding machine. The dried powder was course enough to flow freely through the feed hopper and into the injection screw. It was also course enough to uniformly melt and convey through the injection screw. The mold temperature was set at 150 degrees C. The composition was molded at 305 degrees C., a substantial reduction from the recommended molding temperature for the neat Lexan Resin C893525 Powder (about 340 degrees C.). The combination of the incorporation of the additive Composition in Table 17 and the substantially low molding temperature resulted in exceptionally clear molded plaques, 2 inches square by 2 mm thick.

The plaques were ground and polished to clean the surface from scratches due to scratches in the metal mold. The 2 inch square by 2 mm thick plaques were ground and polished to a thickness of 0.8 mm. The 0.8 mm thick plaques were measured for light transmission measurements using a Vasse Ellipsometer which is well known to those skilled in the art or any other suitable instrument in accordance with ASTM standards which are well known to those skilled in the art such as ASTM D1003-13, Standard Test Method for Haze and Luminous Transmittance of Transparent Plastics.

Plotted are intensity transmission data: The dotted black line in FIG. 2 represents the maximum theoretical transmission for the index of refraction shown in FIG. 1 (1.62 at 589 nm) assuming perfectly smooth and perfectly parallel plaque surfaces, having a reflection loss of 8% (4% for each side).

Figure 2:
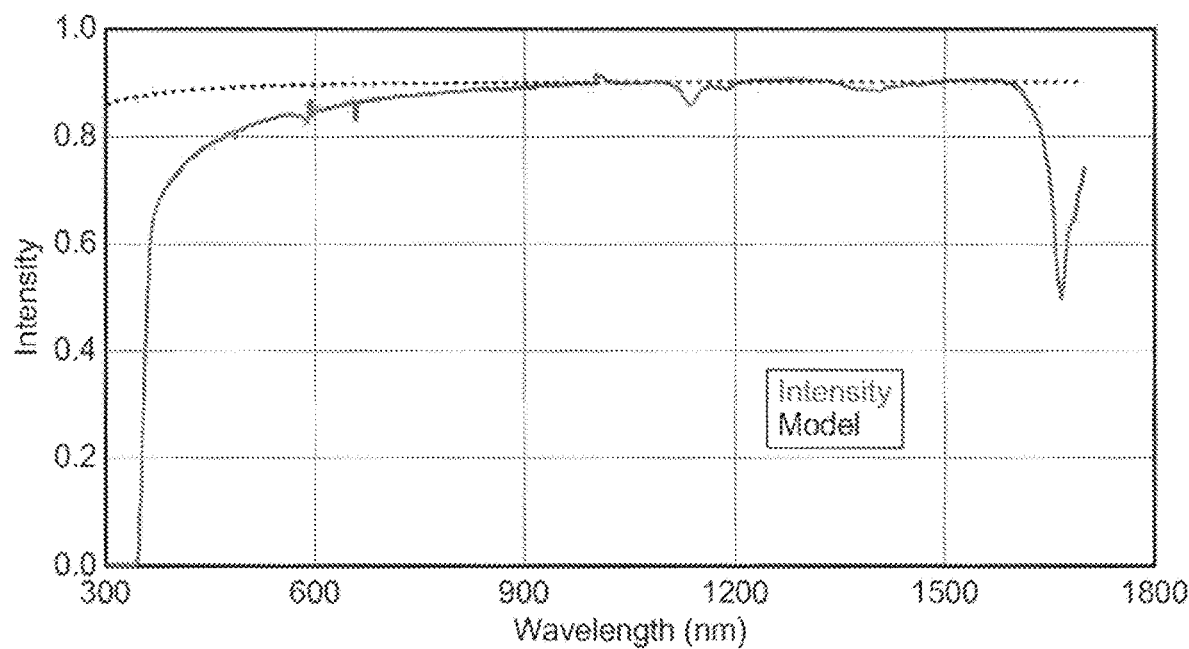
FIG. 2 is luminous-transmission data of an embodiment.

The solid colored line in FIG. 2 is the actual light transmission measurement of the molded plaque (0.8 mm thickness) from the thermoplastic composition shown in Table 18. Transmission losses in the visible spectrum are anticipated due to the surface roughness of the substrate and imperfect geometry of the plaque. The surface roughness scatters light and reduces light transmission in the visible light spectrum. Visible inspection of the substrate revealed some distortion in visible images. Distortion in the visible light spectrum diverts light away from the collector and reduces light transmission in the visible light range. The fact that the plaques remain clear irrespective of thickness, as shown, in FIG. 4, indicates that any light transmission loss in the visible light spectrum is due to light scattering and distortion and not absorption. It is anticipated that a more perfect plaque finish with a more perfect plaque geometry would yield near optimum light transmission in the visible spectrum in the measured plaque.

Figure 3:
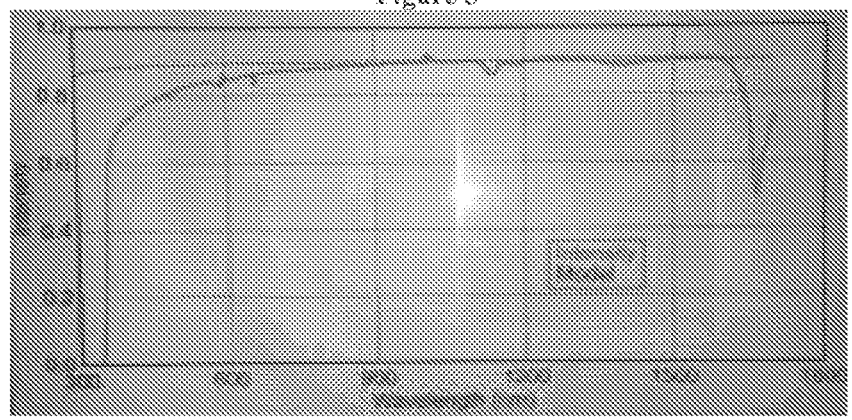
FIG. 3 is luminous-transmission data of an embodiment.

A photograph of the actual plaque measured is shown in FIG. 3.

The refractive index changes with the wavelength of light, and measures about 1.61 at 589 nm measured with a M-200 Ellipsometer or any other suitable instrument in accordance with ASTM standards which are well known to those skilled in the art such as ASTM D542-14, Standard Test Method for Index of Refraction of Transparent Organic Plastics.

TABLE 19:

Theoretical vs. Measured (Actual) Light Transmission

| Wavelength of Light (nm) | Theoretical Maximum Light Transmission | Actual Measured Light Transmission |
| --- | --- | --- |
| 361 | 0.878 | 0.546 |
| 400 | 0.884 | 0.727 |
| 450 | 0.889 | 0.785 |
| 500 | 0.893 | 0.816 |
| 550 | 0.895 | 0.836 |
| 593 | 0.896 | 0.867 |
| 700 | 0.899 | 0.873 |
| 800 | 0.900 | 0.884 |
| 900 | 0.901 | 0.893 |
| 1000 | 0.901 | 0.899 |
| 1100 | 0.902 | 0.901 |
| 1200 | 0.902 | 0.899 |
| 1300 | 0.902 | 0.905 |
| 1400 | 0.902 | 0.887 |
| 1500 | 0.903 | 0.903 |
| 1600 | 0.903 | 0.894 |

In FIGS. 2 and 3, light intensity is light transmission. For example, a light intensity of 0.8 is equivalent to a light transmission of 80%. The light transmission is shown for UV, visible and infrared light measured as having a wavelength of 360 to 1600 nanometers. For example, light having a wavelength of 360 nm to 390 nm is long wave Ultraviolet (UV) light, light having a wavelength of 390 to 700 nm is visible light, and light having a wavelength of greater than 700 nm is infrared light which is well known by those skilled in the art.

The plaques molded from the thermoplastic composition of Table 18 exhibit exceptional light transmission quality and are highly transparent from about 360 nm to about 1600 nm.

The plaques molded from the thermoplastic composition of Table 18 exhibit excellent yellowing resistance after injection molding at a temperature between 300° C. to 326° C., and more specifically between 305° C. and 320° C. in which the molded plaque, as shown in Table 18 exhibits a yellow index (Y.I.) of 3.0 or less, and the same plaque, when continuously heated at 150° C. for 250 hours in a sealed vacuum oven, without the vacuum on, exhibits a yellow index of 5.0 or less. The yellow index can be measured by ASTM E313 Yellowness Index (Ye.

Surprisingly, the same plaques exhibit excellent fire retarding characteristics without the use of halogenated fire retardant additives.

It is desirable and commercially valuable to obtain an Underwriters Laboratory (UL) fire retardancy rating of V2 or better for transparent thermoplastic for use in a wide variety of lighting, electronic, and automotive applications.

It is most valuable to obtain a UL 94 VO rating for a transparent thermoplastic having a thickness of 2.0 mm or less, and more preferably, a thickness of 1 mm or less.

The following is a description of the UL 94 VO, V1, and V2 test which is well known to those skilled in the art.
Vertical Testing (V-0, V-1, V-2)

Procedure: A specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

| Vertical Ratings | Requirements |
|---|---|
| V-0 | Specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame. |
| V-1 | Specimens must not burn with flaming combustion for more than 30 seconds after either test flame application. Total flaming combustion time must not exceed 250 seconds for each set 5 specimens. Specimens must not burn with flaming or glowing combustion up to the specimen holding clamp. Specimens must not drip flaming particles that ignite the cotton. No specimen can have glowing combustion remain for longer than 60 seconds after removal of the test flame. |
| V-2 | Specimens must not burn with flaming combustion for more than 30 seconds after either test flame application. Total flaming combustion time must not exceed 250 seconds for each set 5 specimens. Specimens must not burn with flaming or glowing combustion up to the specimen holding clamp. Specimens can drip flaming particles that ignite the cotton. No specimen can have glowing combustion remain for longer than 60 seconds after removal of the test flame. |

A 2 mm thick plaque molded from the composition of Table 18 above was subjected to a Butane Oxygen Assisted Flame 35 mm in length, having a temperature of 1,760 degrees C., generated from a Butane Microtorch Bemzomatic ST 200 torch. A cotton mass was placed 6 inches below the flame. Applied flame for 10 seconds. The material began to char and ignited after 6 seconds. Removed the flame at 10 seconds. The material extinguished flame immediately. Did not glow. Charring occurred.

Figure 4:
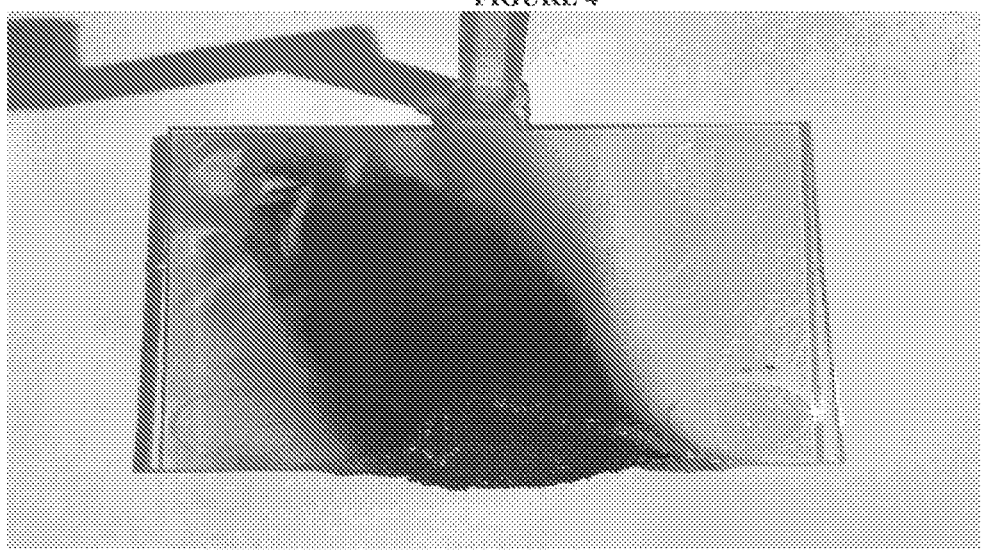
FIG. 4 is an image showing an embodiment's UL 94 VO rating performance.

Reapplied same flame for 10 seconds. The material ignited at 5 seconds, held small flame until 10 seconds, flame was removed at 10 seconds. Flame extinguished immediately and no glowing. No particles separated from the plaque and no plastic was dripping. The test specimen is shown in FIG. 4. The test demonstrates a UL 94 VO rating performance.

Figure 5:
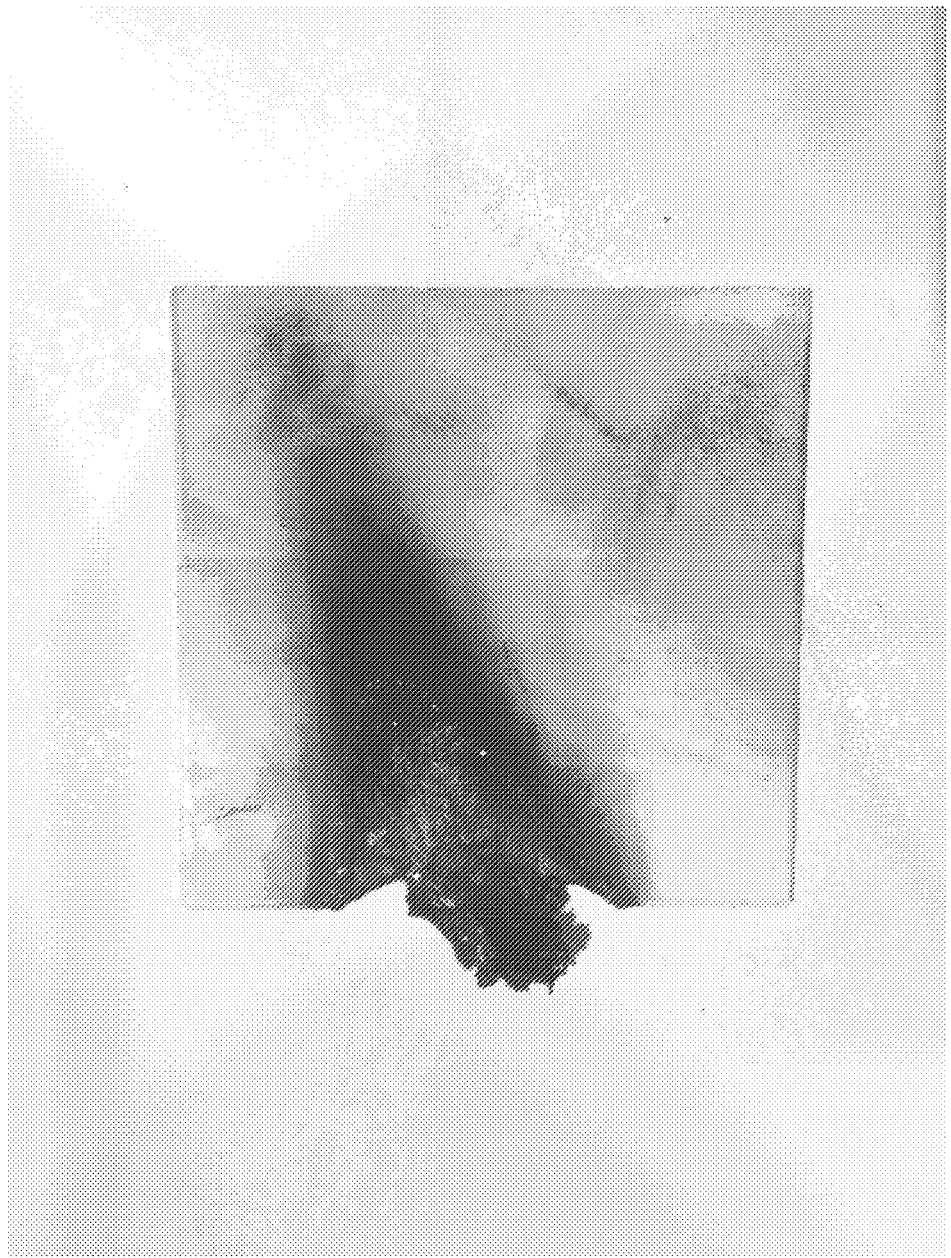
FIG. 5 is an image showing an embodiment's UL 94 VO rating performance.

A 0.8 mm thick plaque molded from the composition of Table 18 above was subjected to a Butane Oxygen Assisted Flame 35 mm in length, having a temperature of 1,760 degrees C., generated from a Butane Microtorch Bernzomatic ST 200 torch. A cotton mass was placed 6 inches below the flame. Applied flame to the material for 10 seconds. The material ignited after 4 seconds with only a very small flame from material present. Material held a very small flame until the flame from the torch was removed at the end of 10 seconds. After the 10 seconds and the flame was removed the small flame was extinguished immediately. Charring occurred. The same flame was reapplied for 10 seconds. The material ignited after 6 seconds and held a very small flame and glowed until the flame was removed after 10 seconds, then continued to hold a very small flame and glowed for 4 seconds. The glow and flame was then completely extinguished. No particles separated from the plaque and no plastic was dripping. The test specimen is shown in FIG. 5. The test demonstrates a UL 94 VO rating performance.

It is also desirable to have an optically transparent thermoplastic that has a UL 94 VO performance at 0.8 mm thickness that is thermally and hydrolytically stable. A 0.8 mm thick plaque molded from the thermoplastic composition of Table 18 and possessing all of the characteristics as shown above was placed in a glass jar and subjected to boiling water for ten minutes. After boiling the aforementioned plaque for 10 minutes in boiling water, the plaque retained the same light transparency as shown above, did not yellow, and did not show any change in surface smoothness (n0 surface defects).

It is surprising and unexpected that a thermoplastic composition molded into a plaque can exhibit a combination of the optical properties, fire retardancy properties and hydrolytical resistance properties as shown above in Example 1 while being comprised of only 1.01% of an Additive by total weight of the host thermoplastic, as shown in Table 17 and Table 18, and also comprise less than 0.005% of a non-halogenated fire retardant component or additive by total weight of the total thermoplastic composition.

Example 2

A dye concentrate is prepared by mixing and grinding the materials shown in the following Table 20:

TABLE 20

| Material: Dye Concentrate | % by Weight of Total Dye Concentrate Formula: |
|---|---|
| Mixture of saturated and unsaturated fatty esters; INT-40DHT | 99.4 |
| High temperature stable blue dye/dry powder; Amplast Blue R3 Dye | 0.2 |
| High temperature stable violet dye/dry powder; Amplast Violet BV Dye | 0.2 |
| Inorganic particulates with average particle size <100 nm; Aluminium Oxide C | 0.2 |
| Total | 100 |

An Additive composition is prepared by mixing the foregoing Dye Concentrate composition and the materials listed in the following Table 21 into a free flowing dry powder:

TABLE 21

| Material: Additive Composition | % by Weight of Total Additive Composition: |
|---|---|
| Mixture of saturated and unsaturated fatty esters; INT-40 DHT | 52.60 |
| Dye Concentrate; Dye Concentrate Formula from Table 15 | 2.90 |
| Inorganic particulates with average particle size <100 nm; Aluminium Oxide 805 C | 10.20 |
| High molecular weight, low volatility secondary antioxidant; Doverphos S-9228PC, solid phosphite antioxidant (Bis (2,4-dicumylphenyl) pentaerythrithol diphosphite) | 26.10 |
| High molecular weight, low volatility primary antioxidant, Mayzo 1076 | 8.20 |
| Total | 100 |

A thermoplastic composition is prepared by mixing the foregoing Additive composition and the materials listed in the following Table 22 into a free flowing dry powder:

TABLE 22

| Material: | % by Weight of Total Additive Composition: |
|---|---|
| Additive Composition of Table 17 | 0.70 |
| Polycarbonate thermoplastic, N C893525 polycarbonate homo-polymer coarse powder having a Tg of about 200 degrees C., | 99.30 |
| Total | 100 |

A 2 inch square, 0.8 mm plaque was molded and prepared having a composition shown in Table 22 above and made in the same manner a the plaque and related composition in Example 1 above. The plaque made from the composition in Table 22 had essentially the same light transparency properties as the plaque made in Example 1 above.

Figure 6:
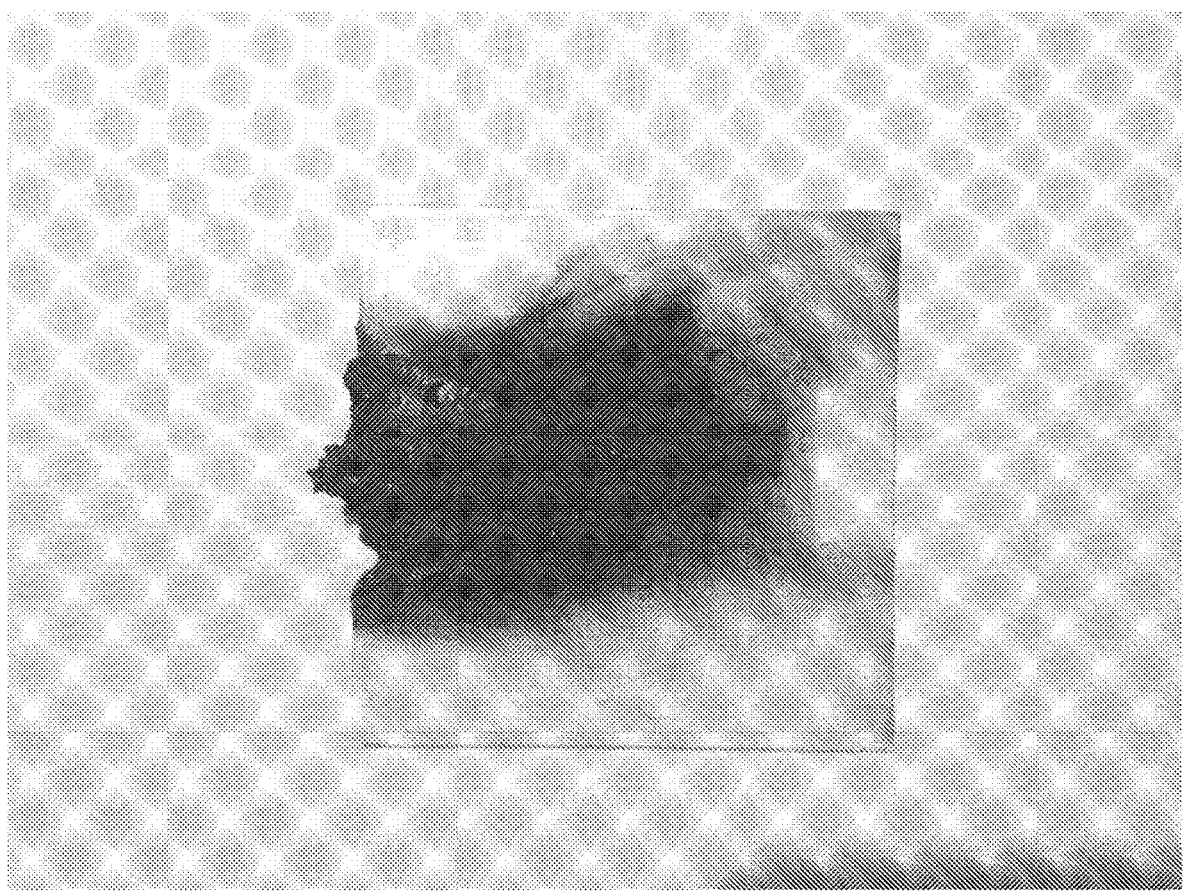
FIG. 6 is an image showing an embodiment's UL 94 VO rating performance.

The 0.8 mm thick plaque molded from the composition of Table 22 above was subjected to a Butane Oxygen Assisted Flame 35 mm in length, having a temperature of 1,760 degrees C., generated from a Butane Microtorch Bernzomatic ST 200 torch. A cotton mass was placed 6 inches below the flame. Applied flame for 10 seconds. Material ignited very slight flame at 5 seconds and glowed to about 7 seconds. At 7 seconds small flame and glowing ceased. Flame was removed at 10 seconds. After removed flame, there was charring, no flaming, no glowing, and no dripping. Same flame reapplied for 10 seconds. The material ignited at about 5 seconds, retained small flame until flame source was removed at 10 seconds. The material retained a small flame and was burning for additional 13 seconds. Flame extinguished itself with charring and no dripping. The test specimen is shown in FIG. 6. The test demonstrates a UL 94 V1 rating performance and for all practical purposes a UL VO performance as the second flame produced a flame and glow on the plaque for only 13 seconds after the second (10 second long duration) flame source was removed. That is only three seconds outside of the UL 94 VO performance specification as presented in Example 1 above.

It is surprising and unexpected that a thermoplastic composition molded into a plaque can exhibit a combination of optical transparency and fire retardancy properties as shown above in Example 2 and while being comprised of only 0.70% of an Additive by total weight of the host thermoplastic, as shown in Table 21 and Table 22, and also comprise no fire retardant component or additive by total weight of the total thermoplastic composition.

I. Formula 41-C, modified polycarbonate HTLT LEXAN XHT 4141 NEAT (#3 above).

Use the following formula:

ADDITIVE—(41-C):

| 44.10 | Grams INT-40DHT (Axel) |
|---|---|
| 44.10 | Grams POSS 1458 Powder |
| 7.40 | Grams Benefos 1010 (Mayzo) Primary Anti-oxidant |
| 4.40 | Grams Aeroxide Aluminium C 805 (Evonik) |
| 100.00 | Total |

Add the INT-40DHT to a mixing bowl, the add the POSS 1458 powder, then add the Benefos 1010, then add the C 805, the blend and intergrind all the ingredients into a fine powder.

Heat the Lexan XHT 4141 pellets to 135 degrees C. While hot, sprinkle 0.68% by total weight of pellets of the HTLT-4141-C additive onto the hot pellets and tumble blend for 5 minutes. For example a good ratio for blending is 10 lbs. of pellets in a five gallon pail.

41 C Polycarbonate Composition:

| 0.68% | Additive Composition |
|---|---|
| 99.32% | Lexan XHT 4141 Polycarbonate |
| 100.00% | |

Dry blended pellets to 0.02% or less moisture (about 6 hours at 135 degrees C. in a vacuum oven), the injection mold at about 310 C.

Plaques (2 inches square×2 mm thick and 5 mm thick were injection molded ate PTI, Toledo, Ohio, on 11/22/13 on a 35 mm screw, single screw extruder. See PTI print out on injection molding temperatures including a mold temperature of 150 C.) The 5 mm, HTLT XHT 4141-C plaques molded exceptionally well at about 310 C and were far more optically clear than the 5 mm plaques molded with Sabic-IP's Lexan XHT 4141 Neat plastic pellets. The 2 mm thick, HTLT 4141-C plaques were able to be molded at about 305 C and a cycle time of 22.5 seconds versus the Lexan XHT 4141 plaques that were molded at 335 C and a cycle time of 29.5 seconds. This is a very significant drop of about 30 degrees C. in process temperature. The mold temperature was 130 degrees C. Consequently, the combination of the using the above 41-C additive above and the low molding temperature produced a 2 mm plaque that was optically clear with no visible yellowing versus the yellowing in the Sabic Lexan XHT 4141 neat plaques.

II. #7 Formula—Modified Lexan C893525 Powder Resin, 190-200 C Tg, raw material for the Sabic-IP, Lexan XHT 4141 thermoplastic.

The Lexan C893525 powder is made commercially by Sabic-Ip and is not confidential. Since it is polymerized in a commercial plant, the powder is very coarse and free flowing. Consequently, the powder could be fed directly into the injection molding machine without compounding after it was blended with the following additive embodiment.

Additive (#7) (formula):

| | |
|---|---|
| 4.50 | Grams HTLT Dye Concentrate AA-2*** |
| 52.20 | Grams INT-40DHT (Axel) |
| 22.40 | Grams Doverphos 9228 PC (Dover Chemical). |
| 13.40 | Grams Mayzo Benefos 1010 (Mayzo) |
| 7.50 | Grams Aluminium Oxide C 805 (Evonik |
| 100.00 | Grams Total (100%) to be used at 0.67% by total weight of C893525 powder resin. |

Intergrind all the above ingredients together as described in Formula #9 below and blend, 0.67% by weight into total weight of the C893525 powder.

POSS Additive for #7 (formula):

2.00 Grams Aeroxide Aluminium C 805 (Evonik)
1.00 Grams FR 2025 Flame Retardant (3M Company)
96.0 Grams POSS 1458 Powder (Hybrid Plastics)
Total (100%) to be used at 2.5% by total weight of C893525 powder resin.

Intergrind the POSS into a fine powder then intergrind the other ingredients together with the POSS powder. Blend the powder into the C893525 powder at 2.5% by total weight of C893525 powder.

Polycarbonate Composition:

| | |
|---|---|
| 0.70% | Additive Composition #7 |
| 2.50% | POSS Additive #7 |
| 96.80% | Lexan C893525 Lexan Polycarbonate |
| 100.00% | |

The HTLT #7 plaques (2 inches square×2 mm thick) molded exceptionally well at 310 degrees C. but the plaques were still quite hazy and not nearly clear enough.

III. #9 Additive and Polycarbonate Composition.

The C893525 Lexan Polycarbonate homo-polymer, powder is made commercially by Sabic-Ip and is not confidential. Since it is polymerized in a commercial plant, the powder is very course and free flowing. Consequently, the powder could be fed directly into the injection molding machine without compounding after it was blended with the following Suncolor additive.

To make the #9 Formula, make the following Additive:

Additive Composition for #9:

2.90 GRAMS HTLT GRADE AA-2 DYE CONCENTRATE
(see formula instructions below***)
51.60 GRAMS INT-40DHT Powder (Axel Corporation)
26.10 GRAMS Doverphos S-9228 PC (Dover Chemical)
8.20 GRAMS Irganos 1076 Primary Antioxidant
10.20 GRAMS Aeroxide Aluminium Oxide C 805 (surface treated)**
(Degussa)
100.00 GRAMS TOTAL 0.10 GRAMS Amplast Blue HP Dye (high temp. resistant)
0.10 GRAMS Amplast Violet PK Dye (high temperature resistant)
0.20 GRAMS Aluminium Oxide C
99.60 GRAMS INT-40 DHT Powder
100.00

Polycarbonate Composition:

| | |
|---|---|
| 0.70% | Additive Composition |
| 99.30% | Lexan C893525 Lexan Polycarbonate |
| 100.00% | |

The 2 mm thick, #9 plaques were able to be molded at about 305 C and a cycle time of 22.5 seconds versus the Lexan XHT 4141 plaques that were molded at 335 C and a cycle time of 29.5 seconds. This is a very significant drop of about 30 degrees C. in process temperature. The mold temperature was 130 degrees C. Consequently, the combination of the using the above #9 additive above and the low molding temperature produced a 2 mm plaque that was optically clear with no visible yellowing versus the yellowing in the Sabic Lexan XHT 4141 neat plaques.

Processing of additive, polycarbonate composition and molding:

First add the HTLT AA-2 Dye Concentrate to the INT 40-DHT powder, blend for 2 minutes and then blend and intergrind the two ingredients using a grinding action such as a coffee grinder or NINJA type grinder. Nest, add the Doverphos S-9228, the Irganos (or Mayzo) 1076, then the Aeroxide Aluminium Oxide C 805 together and blend for two minutes, then intergrind all of the ingredients together in a NINJA type blender/grinder for 3 minutes. Add and blend 0.70% Additive by total weight of the C893525 Lexan powder resin. The blending can be tumble blending (no grinding) or using a blender such as a Continental Products, ROLLO MIXER-Batch Mixer, Continental products, Wisconsin or similar. This type of blender can be used for any of the formulations combining HTLT Additives and Lexan powder resins. The powder composition is then dried at about 130 degrees C. in a vacuum oven for 4 to 6 hours or until the powder has a moisture content of less than 0.02%, and less than 0.01% preferred. The powder composition can be fed into a hopper having a preferred temperature of about 80 degrees C., then directly into a screw injection molding machine and melt processed at about 280 degrees C. to about 310 degrees C., with temperatures of 300 degrees C. preferred, and molded into objects. The processing temperature was reduced from 340 degrees C. required for injection molding the neat C893525 Lexan powder resin. The metal mold temperature can range from 130 degrees C. to 180 degrees C., with a higher temperature preferred. Plaques 2 inches square by 2 mm thick were injection molded. The plaques were optically transparent.

Alternatively, the Additive composition (above) can be blended into the polycarbonate powder resin and the total blended composition (powder) can be fed into a screw extruder and melt extruded into strands at a temperature of about 275 degrees C. to about 310 degrees C., and the strands chopped into pellets. The pellets are then dried at about 130 degrees C. in a vacuum oven for 4 to 6 hours or until the pellets have a moisture content of less than 0.02%, and less than 0.01% preferred. The pellets can be fed into a hopper having a preferred temperature of about 80 degrees C., then directly into a screw injection molding machine and melt processed at about 280 degrees C. to about 310 degrees C., with temperatures of 300 degrees C. preferred, and molded into objects.

Alternatively, the Additive composition (above) and the polycarbonate powder resin be metered separately into a screw extruder, mixed and melt extruded into strands at a temperature of about 275 degrees C. to about 340 degrees C., and the strands chopped into pellets. The pellets are then dried at about 130 degrees C. in a vacuum oven for 4 to 6 hours or until the pellets have a moisture content of less than 0.02%, and less than 0.01% preferred. The pellets can be fed into a hopper having a preferred temperature of about 80 degrees C., then directly into a screw injection molding machine and melt processed at about 280 degrees C. to about 310 degrees C., with temperatures of 300 degrees C. preferred, and molded into objects. The metal mold temperature can range from 130 degrees C. to 180 degrees C., with a higher temperature preferred.

Alternatively, the Additive composition and the polycarbonate powder resin can be blended together and then formed or pressed into a pellet using a tablet press or similar equipment and processes as described in U.S. Pat. No. 6,544,452. The pellets are then dried at about 130 degrees C. in a vacuum oven for 4 to 6 hours or until the pellets have a moisture content of less than 0.02%, and less than 0.01% preferred. The pellets can be fed into a hopper having a preferred temperature of about 80 degrees C., then directly into a screw injection molding machine and melt processed at about 280 degrees C. to about 310 degrees C., with temperatures of 300 degrees C. preferred, and molded into objects. The metal mold temperature can range from 130 degrees C. to 180 degrees C., with a higher temperature preferred.

Alternatively, if the polycarbonate resin is synthesized and produced as a pellet, the pellets can be warmed to a temperature between 80 degrees C. and 130 degrees C. and the Additive composition can be tumble blended onto and melted onto the surface of the warm pellets forming a coated pellet. The pellets are then dried at about 130 degrees C. in a vacuum oven for 4 to 6 hours or until the pellets have a moisture content of less than 0.02%, and less than 0.01% preferred. The pellets can be fed into a hopper having a preferred temperature of about 80 degrees C., then directly into a screw injection molding machine and melt processed at about 280 degrees C. to about 310 degrees C., with temperatures of 300 degrees C. preferred, and molded into objects. The metal mold temperature can range from 130 degrees C. to 180 degrees C., with a higher temperature preferred.

IV. Formula #9-7 (also referred to as C89-7) Additive and Polycarbonate Composition. This formula was produced by blending nine parts Formula #9 with one part Formula #7 above.

The resultant additive formula for the entire Formula #9-7 is:

| Additive #9-7:* | |
|---|---|
| 3.00 | GRAMS HTLT GRADE AA-2 DYE CONCENTRATE (see formula instructions below***) |
| 52.13 | GRAMS INT-40DHT Powder (Axel Corporation) |
| 26.04 | GRAMS Doverphos S-9228 PC (Dover Chemical) secondary ant-oxidant |
| 7.60 | GRAMS Irganos (or Mayzo) 1076 Primary Antioxidant |

| Additive #9-7:* | |
|---|---|
| 1.18 | GRAMS Irganos (or Mayzo) 1010 primary antioxidant |
| 10.05 | GRAMS Aeroxide Aluminium Oxide C 805 (surface treated)** (Degussa) |
| 100.0 | GRAMS TOTAL |

*Used at 0.76% by total weight of the Lexan C893525 Powder. This additive is made in the same way as HTLT #9 Additive above by blending and intergrinding the above ingredients together in a NINJA type blender/grinder. Blend the HTLT #9-7 Additive C893525 Lexan powder resin at 0.76% by weight of the Lexan powder resin by tumble blending or with a ROLLO MIXER-Batch Mixer, Continental Products, Wisconsin or similar.

POSS Additive for #7 (formula):

| | | |
|---|---|---|
| 2.01 | Grams Aeroxide Alluminium C 805 (Evonik) | |
| 1.01 | Grams FR 2025 Flame Retardant (3M Company) | |
| 96.0 | Grams POSS 1458 Powder (Hybrid Plastics) | |
| 100 | Grams Total (100%) to be used at 0.25% by total weight of C893525 powder resin. | |

Blend the POSS additive at 0.25% by total weight into the Lexan C893525 Powder/#9-7 additive mixture.

*** To make the HTLT GRADE AA-2 DYE CONCENTRATE, use the following ingredients and intergrind together into a fine powder:

| | |
|---|---|
| 0.10 | GRAMS Amplast Blue HP Dye (high temp. resistant) |
| 0.10 | GRAMS Amplast Violet PK Dye (high temperature resistant) |
| 0.20 | GRAMS Aluminium Oxide C |
| 99.60 | GRAMS INT-40 DHT Powder |
| 100.00 | |

Intergrind and blend in a NNJA type blender/grinder the above ingredients and then blend the POSS Additive #7 into the C893525 Lexan powder resin at 0.25% by weight of the Lexan powder resin by tumble blending or with a ROLLO MIXER-Batch Mixer, Continental Products, Wisconsin or similar.

Polycarbonate Composition:

| | |
|---|---|
| 0.76% | Additive Composition #9-7 |
| 0.25% | POSS Additive #7 |
| 98.99% | Lexan C893525 Lexan Polycarbonate |
| 100.00% | |

RESULTS: The HTLT #9-7 (same as C-89-7) formula was injection molded by feeding the dried, course powder mixture directly into the injection molding machine. The dried powder was course enough to flow freely through the feed hopper and into the injection screw. It was also course enough to uniformly melt and convey through the injection screw. The mold temperature was set at 150 degrees C. The #9-7 formula was molded at 305 degrees C., a substantial reduction from the recommended molding temperature for the neat Lexan Resin C893525 Powder (about 340 degrees C.). The combination of the incorporation of the HTLT Additives and the substantially low molding temperature resulted in exceptionally clear molded plaques, 2 mm thick, with a slight amount of haze (less haze than Formula HTLT #9) and overall higher luminous light transmission than the #41 C and the #9 plaques. The haze can be improved by polishing the mold for an optical finish, no scratches or roughness and making sure that the powder is drier than 0.01%.

Molded plaques were exceptionally clear and molded very well. The plaques were sent to E nF Plastics in San Jose, Calif. to be ground, polished, and vapor polish to clean the surface from scratches due to scratches in the PTI mold.

Figure 7:
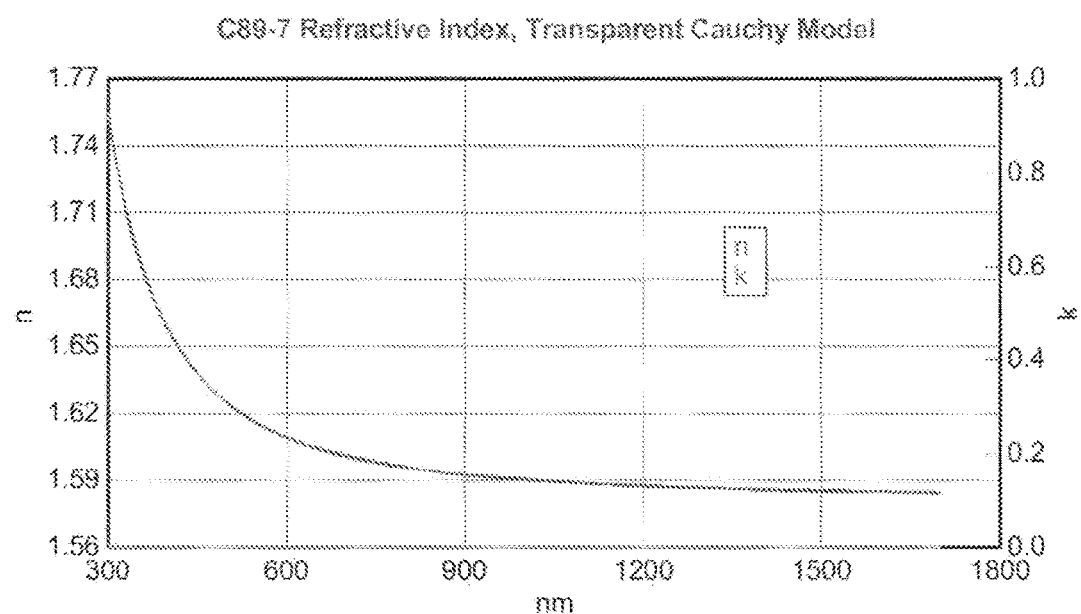
FIG. 7 is refractive-index data of an embodiment.

Code Name C89-7: OPTICAL MEASUREMENT RESULTS:

Plotted are intensity transmission data: The dotted black line in FIG. 8 represents the maximum theoretical transmission for the index of refraction shown in FIG. 7 (1.62 at 589 nm) assuming perfectly smooth and perfectly parallel plaque surfaces, having a reflection loss of 8% (4% for each side).

Figure 8:
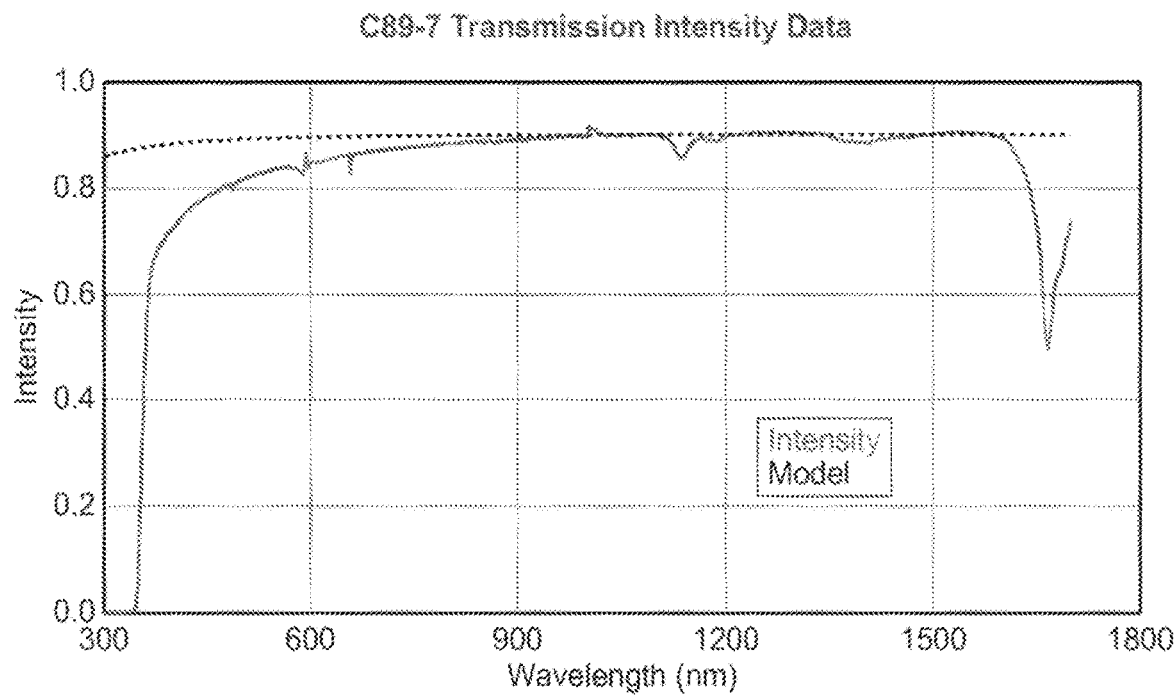
FIG. 8 is luminous-transmission data of an embodiment.

The solid colored line in FIG. 8 is the actual light transmission measurement of the C89-7 plaque (0.8 mm thickness). Transmission losses in the visible spectrum are anticipated due to the surface roughness of the substrate and imperfect geometry of the plaque. The surface roughness scatters light and reduces light transmission in the visible light spectrum. Visible inspection of the substrate revealed some distortion in visible images. Distortion in the visible light spectrum diverts light away from the collector and reduces light transmission in the visible light range. The fact that the C89-7 plaques remain clear irrespective of thickness, as show, in FIG. 4, indicates that any light transmission loss in the visible light spectrum is due to light scattering and distortion and not absorption. It is anticipated that a more perfect plaque finish with a more perfect plaque geometry would yield near optimum light transmission in the visible spectrum in the C89-7 plaque.

Figure 9:
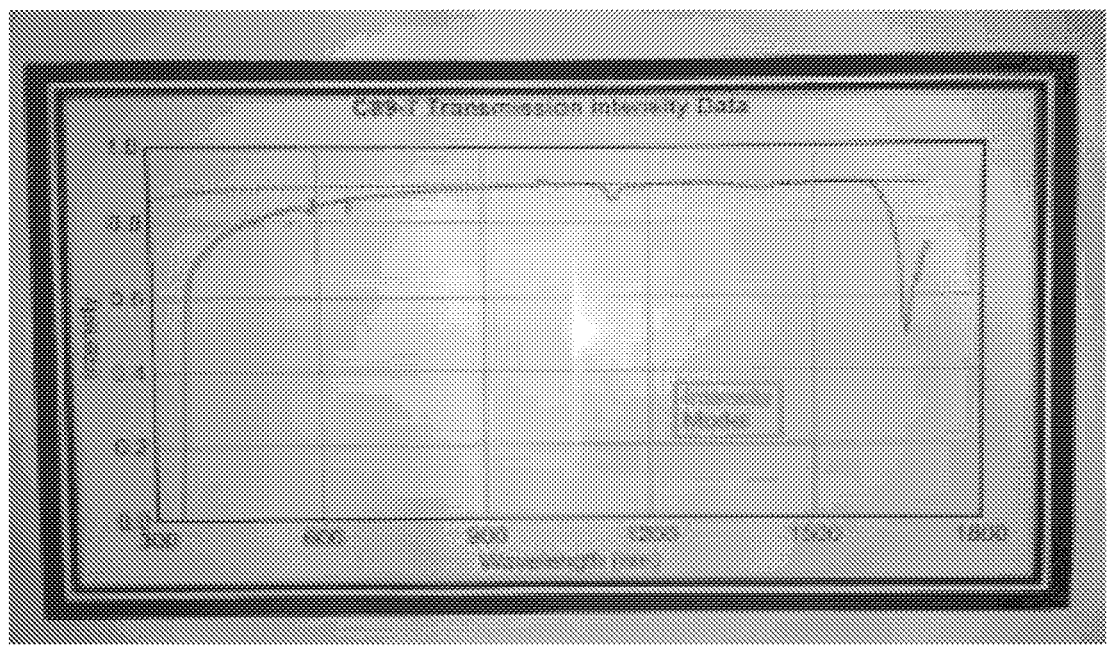
FIG. 9 is luminous-transmission data of an embodiment.

A photograph of the actual C89-7 plaque measured is shown in FIG. 9.

Roughness = 1.43 nm (fit)

- Substrate = C89-7 Transparent Cauchy Model
  A = 1.581 (fit) B = 0.00819 (fit) C = 0.00066231 (fit)
  k Amplitude = 0.00000 Exponent = 1.500
  Band Edge = 400.0 nm The refractive index changes with the wavelength of light, and measures about 1.61 at 589 nm.

TABLE 1

Theoretical vs. Measure (Actual) Light Transmission

| Wavelength (nm) | Theoretical Maximum Transmission | C89-7 Measured Transmission |
|---|---|---|
| 361 | 0.878 | 0.546 |
| 400 | 0.884 | 0.727 |
| 450 | 0.889 | 0.785 |
| 500 | 0.893 | 0.816 |
| 550 | 0.895 | 0.836 |
| 593 | 0.896 | 0.867 |
| 700 | 0.899 | 0.873 |
| 800 | 0.900 | 0.884 |
| 900 | 0.901 | 0.893 |
| 1000 | 0.901 | 0.899 |
| 1100 | 0.902 | 0.901 |
| 1200 | 0.902 | 0.899 |
| 1300 | 0.902 | 0.905 |
| 1400 | 0.902 | 0.887 |
| 1500 | 0.903 | 0.903 |
| 1600 | 0.903 | 0.894 |

Figure 10:
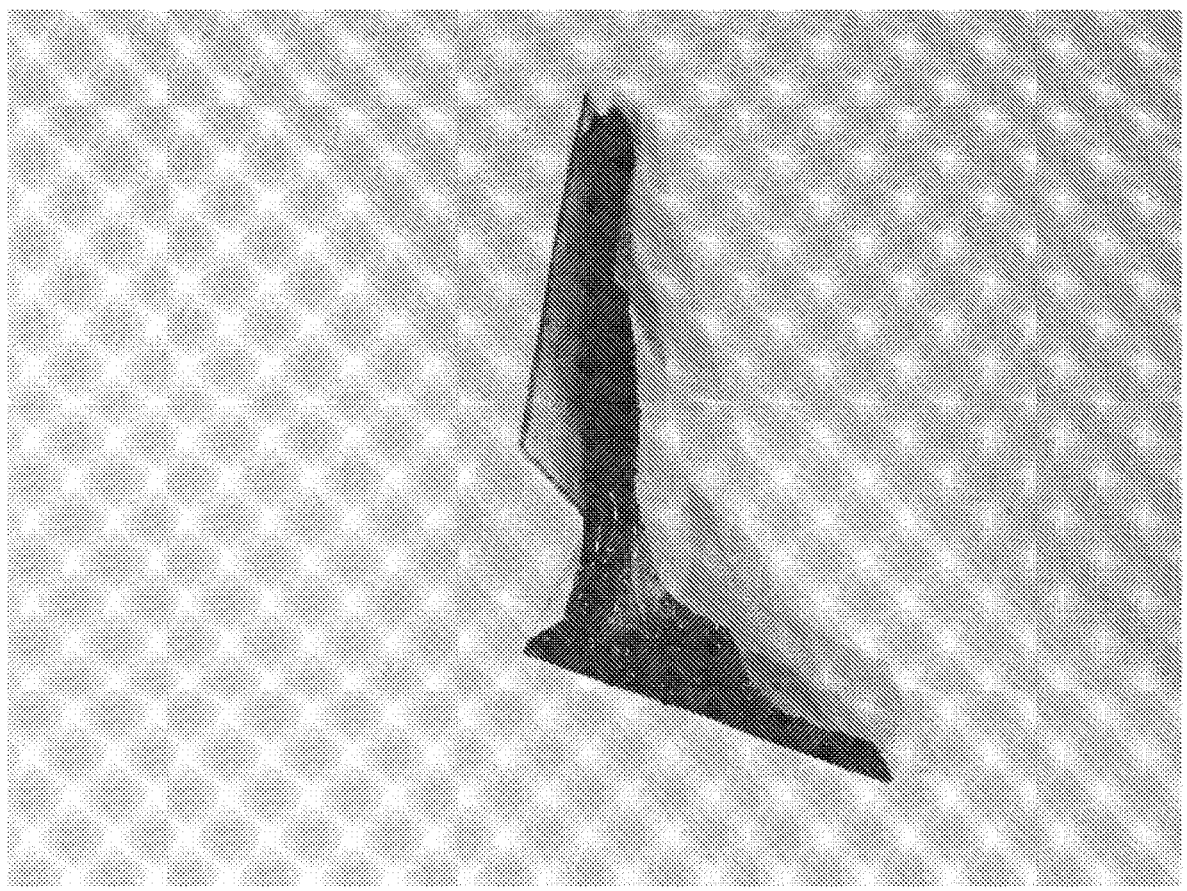
FIG. 10 is an image showing an embodiment's fire-test results.

Regarding FIG. 10, 4141 N (LEXAN XHT 4141)—0.8 mm—Butane Oxygen Assisted Flame 35 mm length Applied flame for 10 seconds. The material ignited after 2 seconds, held a flame and started to drip at 9 seconds. Reapplied the flame for 10 seconds. The material ignited immediately and started to drip after 5 seconds. The flame burned through almost the entire plaque. Ignited the tissue paper.

Figure 11:
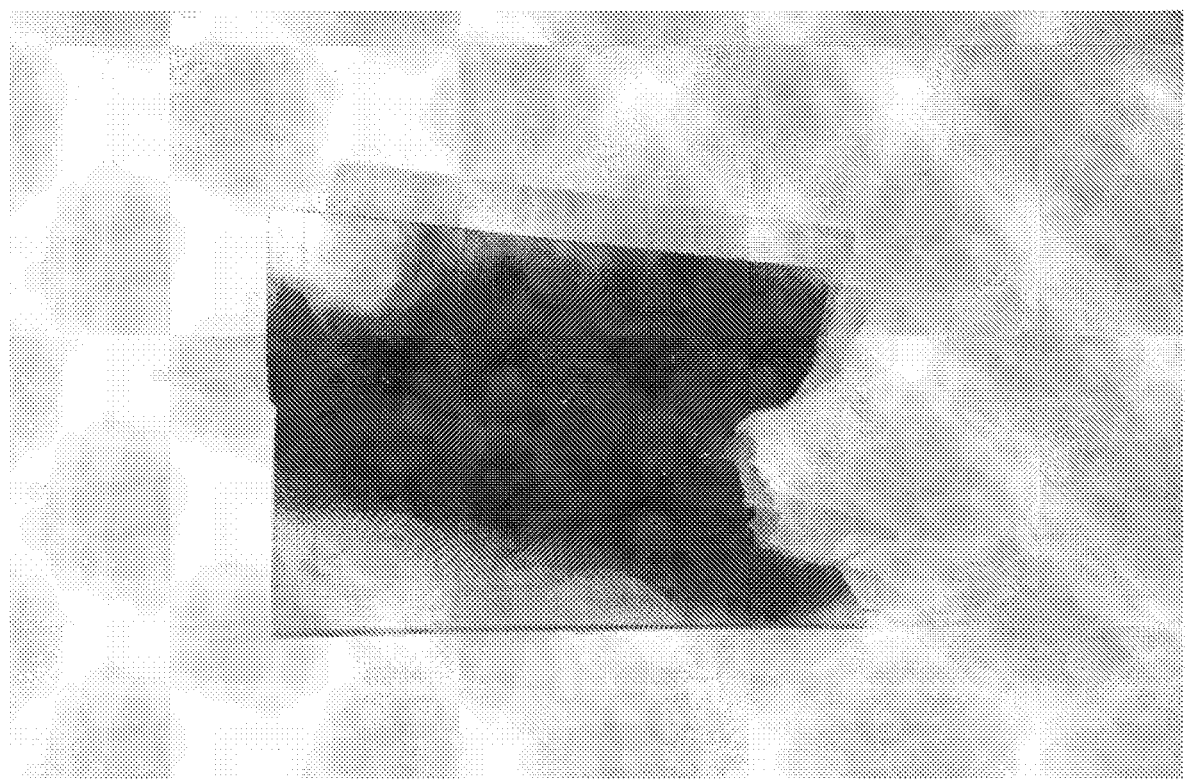
FIG. 11 is an image showing an embodiment's fire-test results.

Regarding FIG. 11, 41 C— 0.8 mm—Butane Oxygen Assisted Flame 35 mm length Applied flame for 10 seconds. Material ignited after 3 seconds, held a small flame and glowed until 10 seconds when the flame was removed. It continued to hold a small flame and glowed for 8 seconds and produced 1 large, un-ignited particle which fell to the paper, but did not ignite the tissue paper. Reapplied same flame for 10 seconds. Material ignited after 3 seconds, held a small flame until the flame was removed at 10 seconds. It continued to hold the flame and glow for another 13 seconds. Flame extinguished. No dripping.

Figure 12:
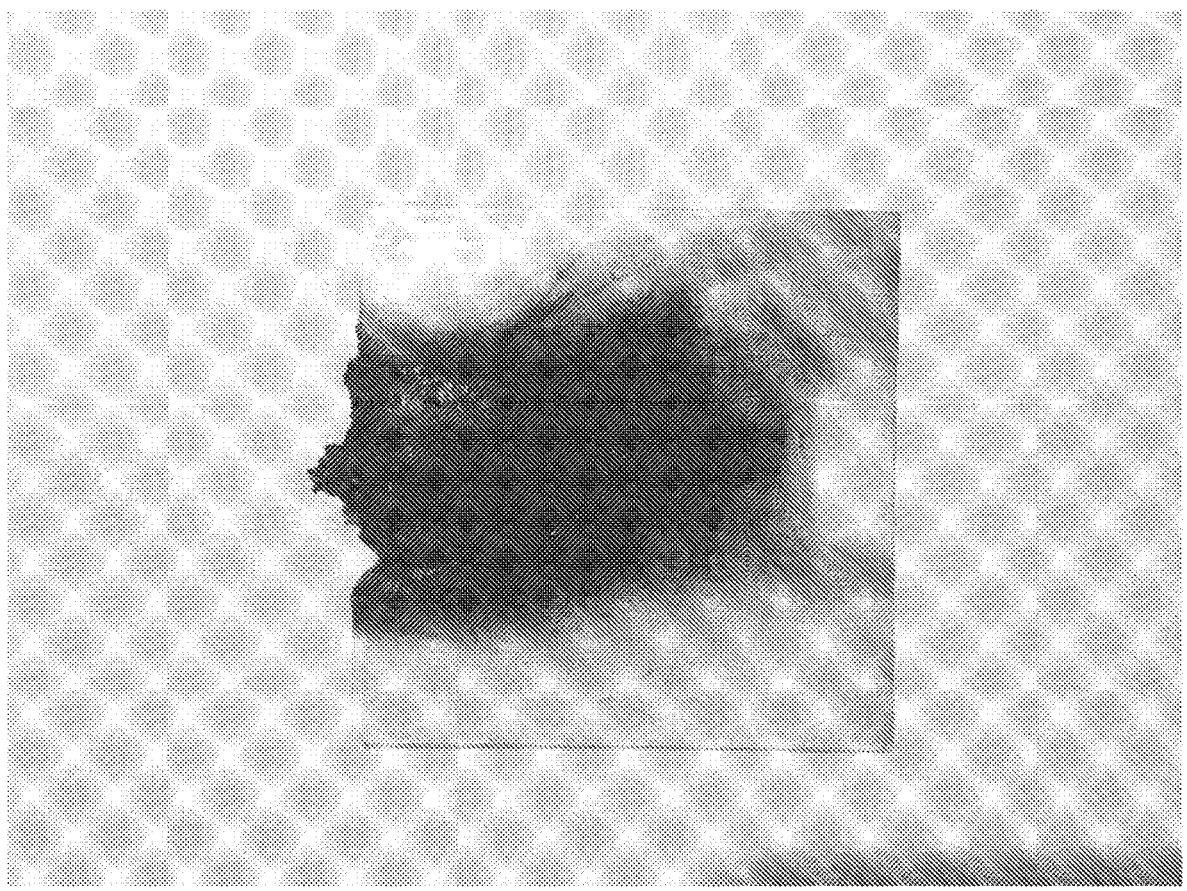
FIG. 12 is an image showing an embodiment's fire-test results.

Regarding FIG. 12, #9 0.8 mm—Butane Oxygen Flame— 35 mm

Applied flame for 10 seconds. Material ignited very slight flame at 5 seconds and glowed to about 7 seconds. At 7 seconds small flame and glowing ceased. Flame was removed at 10 seconds. After removed flame, there was charring, no flaming, no glowing, and no dripping. Same flame reapplied for 10 seconds. The material ignited at about 5 seconds, retained small flame until flame source was removed at 10 seconds. The material retained a small flame and was burning for additional 13 seconds. Flame extinguished itself with charring and no dripping.

Figure 13:
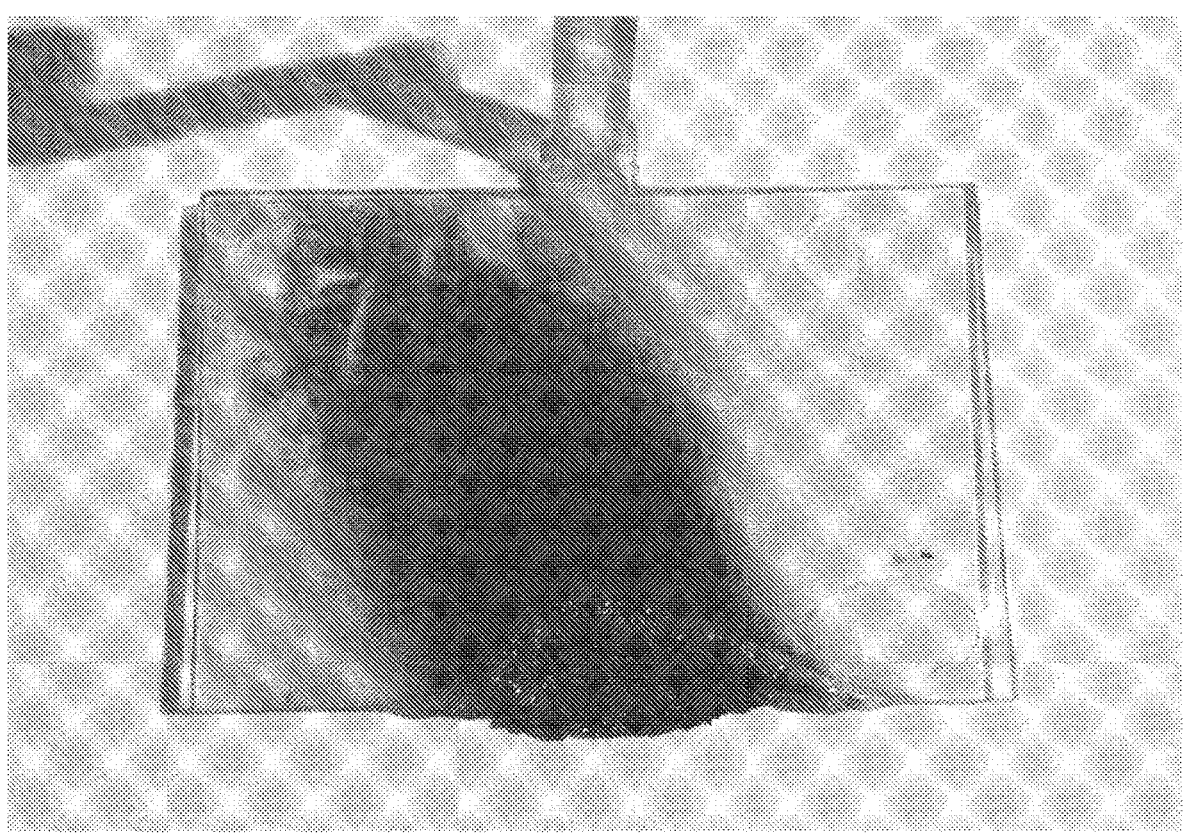
FIG. 13 is an image showing an embodiment's fire-test results.

Regarding FIG. 13, C89-7 2 mm—Butane Oxygen Assisted Flame 35 mm length

Applied flame for 10 seconds. The material ignited after 6 seconds, removed the flame at 10 seconds. The material extinguished flame immediately. Did not glow. Charring occurred. Reapplied same flame for 10 seconds. The material ignited at 5 seconds, held flame until 10 seconds, flame was removed at 10 seconds. Flame extinguished immediately and no glowing.

Figure 14:
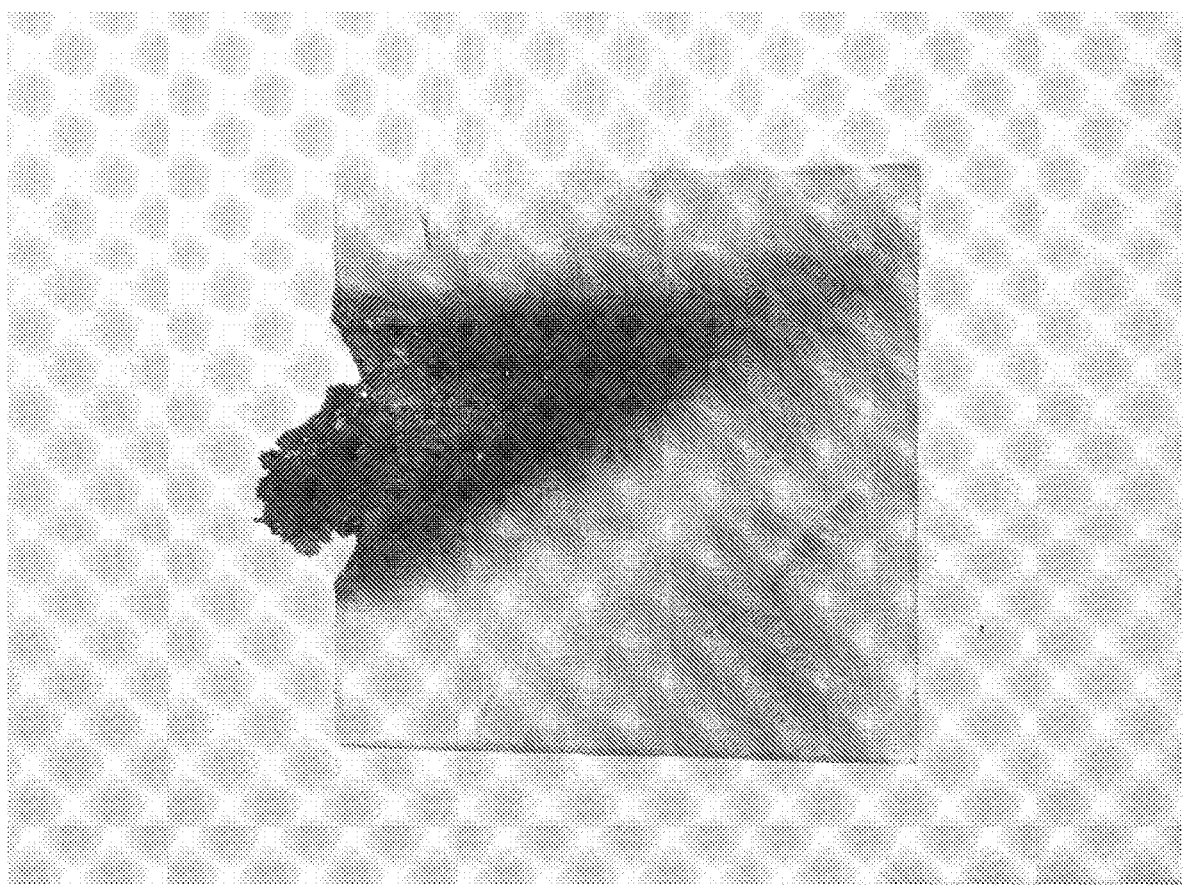
FIG. 14 is an image showing an embodiment's fire-test results.

Regarding FIG. 14, C89-7 0.8 mm—Butane Oxygen Flame—35 mm

Applied flame to the material for 10 seconds. The material ignited after 4 seconds with only a very small flame from material present. Material held a very small flame until the flame from the torch was removed at the end of 10 seconds. After the 10 seconds and the flame was removed the small flame was extinguished immediately. Charring occurred.

The same flame was reapplied for 10 seconds. The material ignited after 6 seconds and held a very small flame and glow until the flame was removed and continued to hold a very small flame and glow for 4 seconds. The glow and flame was then completely extinguished. No dripping of material occurred.

Figure 15:
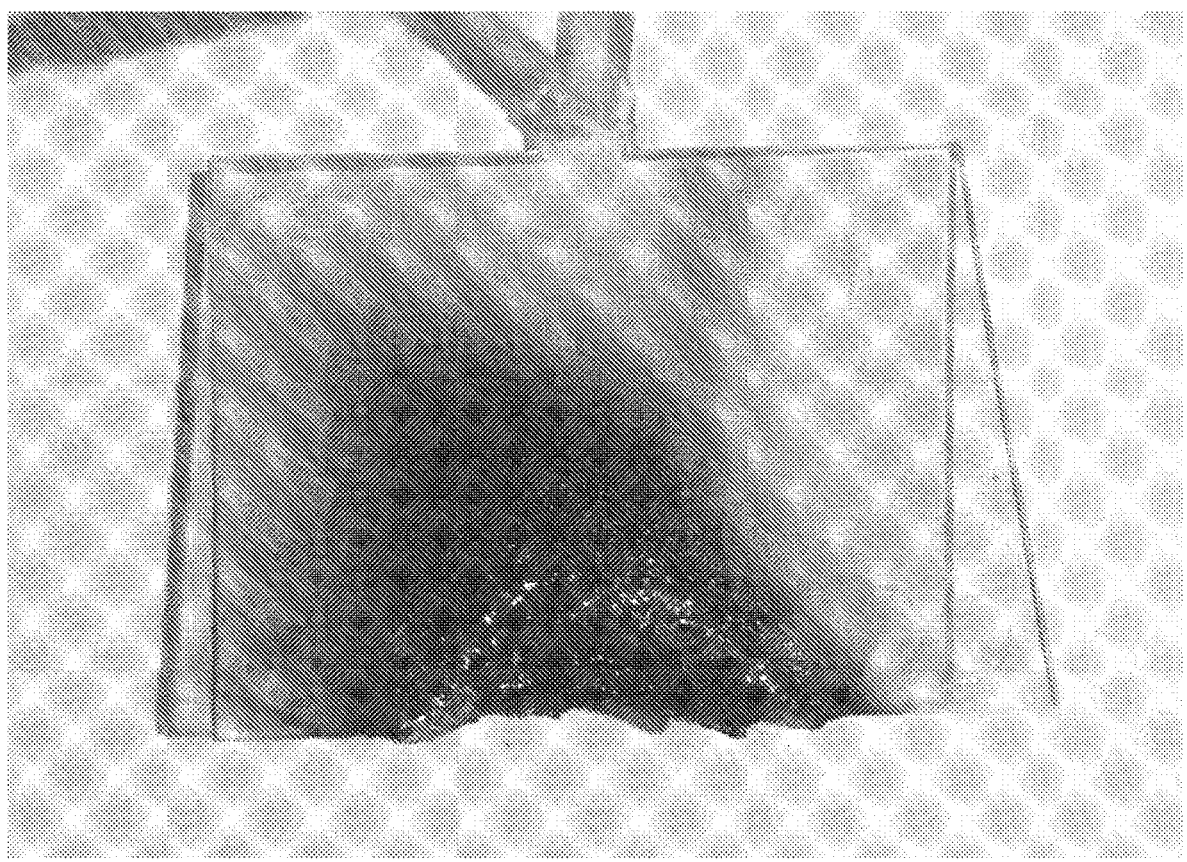
FIG. 15 is an image showing an embodiment's fire-test results.

Regarding FIG. 15, C89-7 2 mm Butane Flame—35 mm Length

Applied a butane flame for 10 seconds. The material ignited at 5 seconds. Removed the flame at 10 seconds, flame extinguished immediately. Created charring to about a ½ in.

Then reapplied the same flame for 10 seconds. The material ignited after 3 seconds, held the flame for about 5 seconds, glowed until flame was removed at 10 seconds. Glowing extinguished within one second after flame was removed.

Figure 16:
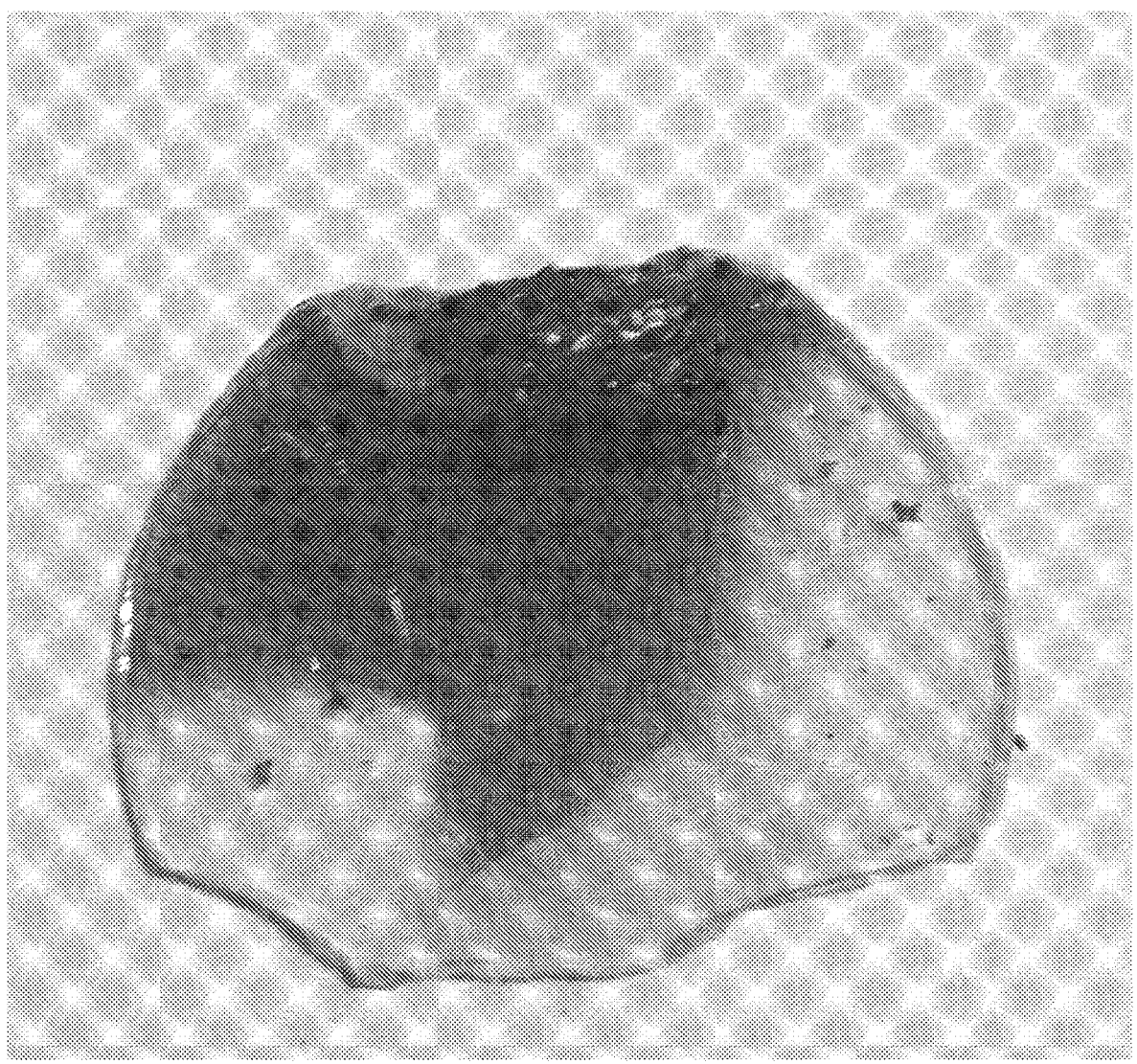
FIG. 16 is an image showing an embodiment's fire-test results.

Regarding FIG. 16, HTLT 1090 1.5 mm Butane Oxygen Flame—35 mm Length

Applied flame for 10 seconds. Material ignited at 4 seconds, extinguished flame at 8 seconds, no glowing, completely extinguished when flame was removed at 10 seconds.

Reapplied same flame for 10 seconds. Material ignited with a flame at 3 seconds, extinguished the flame at 8 seconds, completely extinguished with no glow at the end of 10 seconds when the flame was removed. The charred area was oval, about ½ in. deep. The plaque was 1½ in. diameter×1 in. deep.

Figure 17:
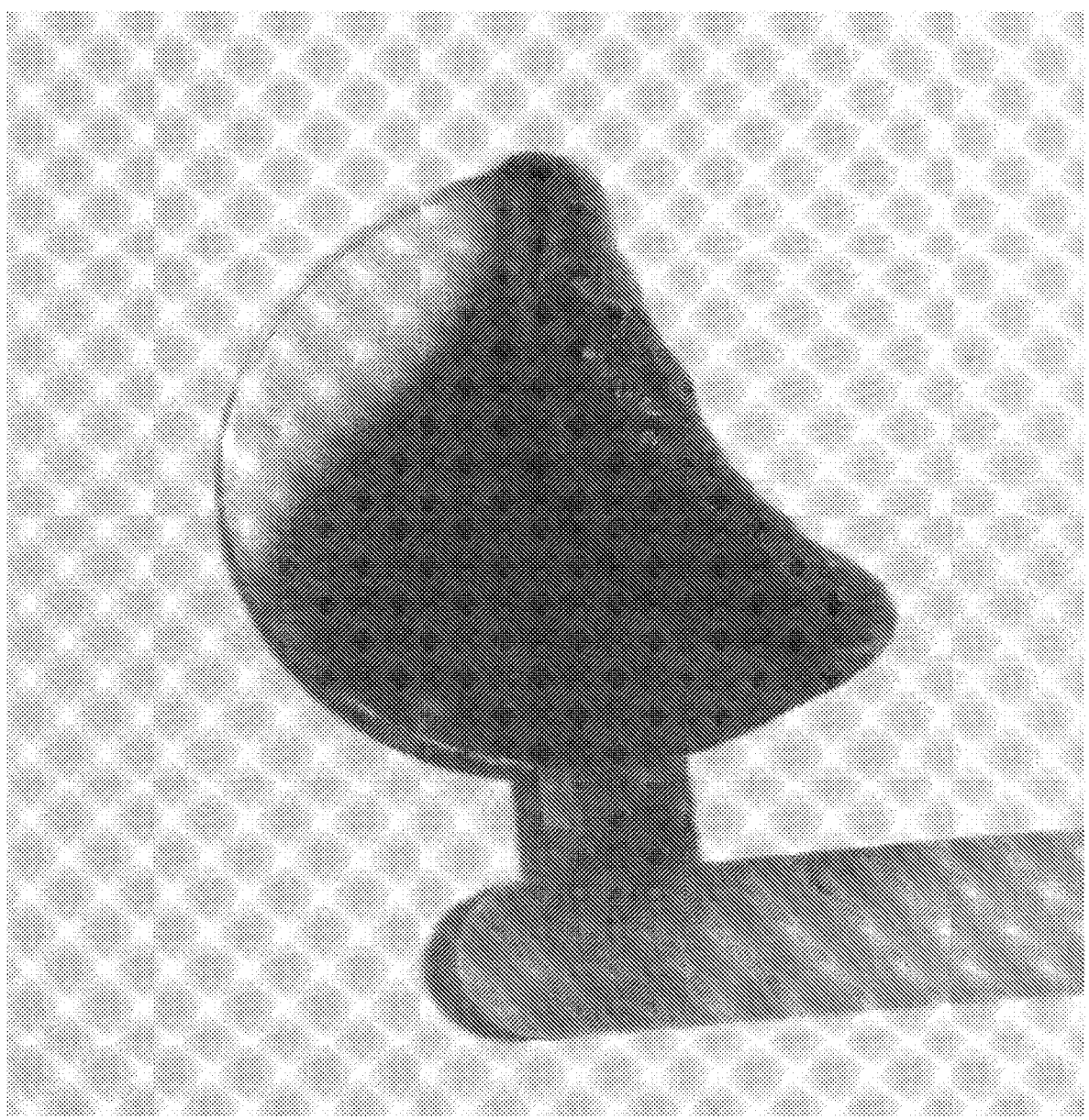
FIG. 17 is an image showing an embodiment's fire-test results.

Regarding FIG. 17, HTLT 100 PGA 1.5 mm—1 in. round plaque—Butane Oxygen Flame—35 mm Applied flame for 10 seconds. Material ignited at 4 seconds, held a flame until 6 seconds until the flame source was removed at 10 seconds. It continued to ignite and held a flame for 15 more seconds. The flame was extinguished and no dripping onto cotton. The same flame was applied for 10 seconds. Material ignited within 4 seconds, continued to hold a flame until the flame source was removed at 10 seconds. It continued to burn for 39 seconds at which time the material started to drip and ignited the cotton below.

Figure 18:
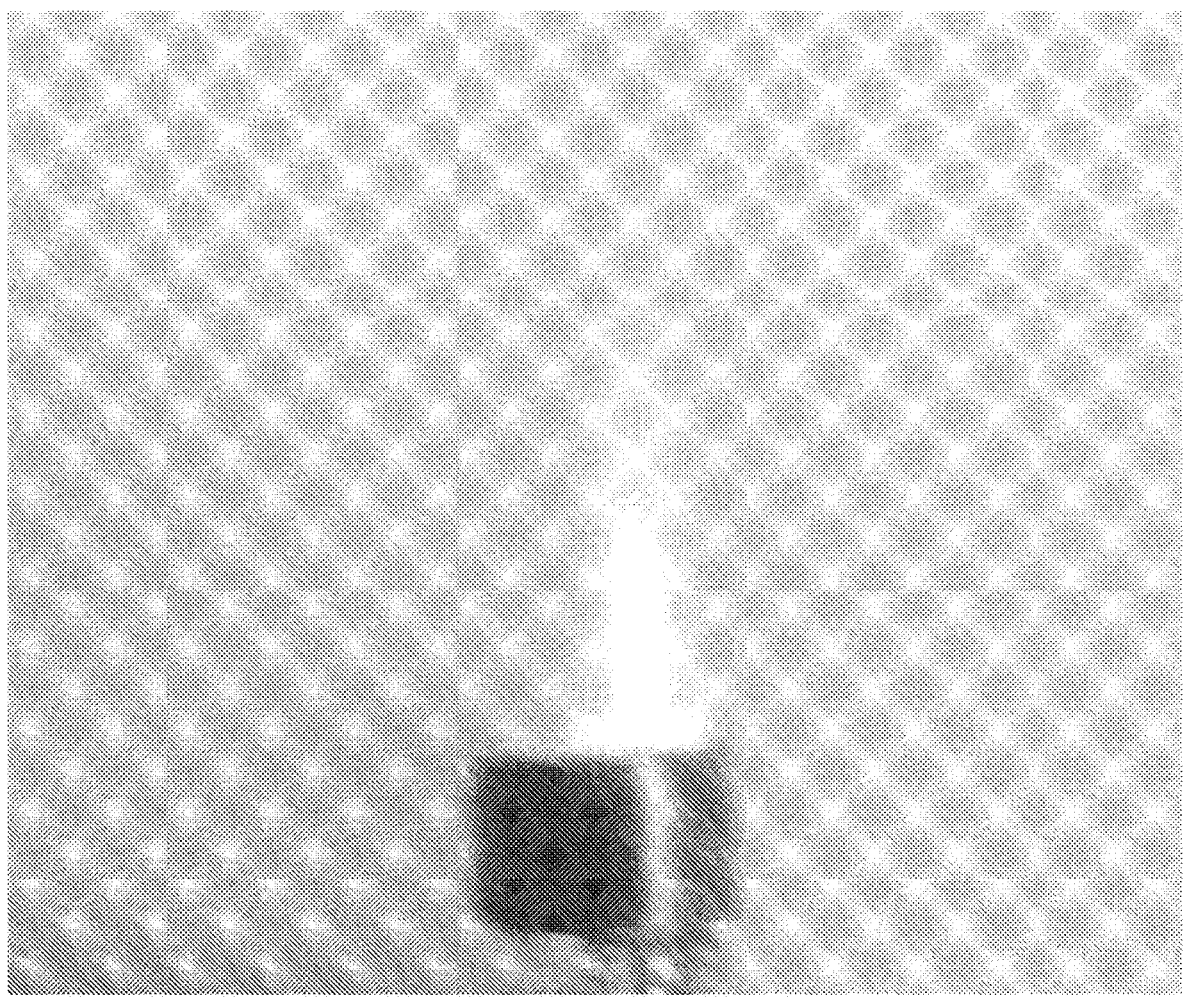
FIG. 18 is an image showing an embodiment's fire-test results.

Regarding FIG. 18, Butane Flame—+35 mm/Butane MicroTorch Bernzomatic ST 2200 Flame Temperature: 4925° F. (2718° C.)

Figure 19:
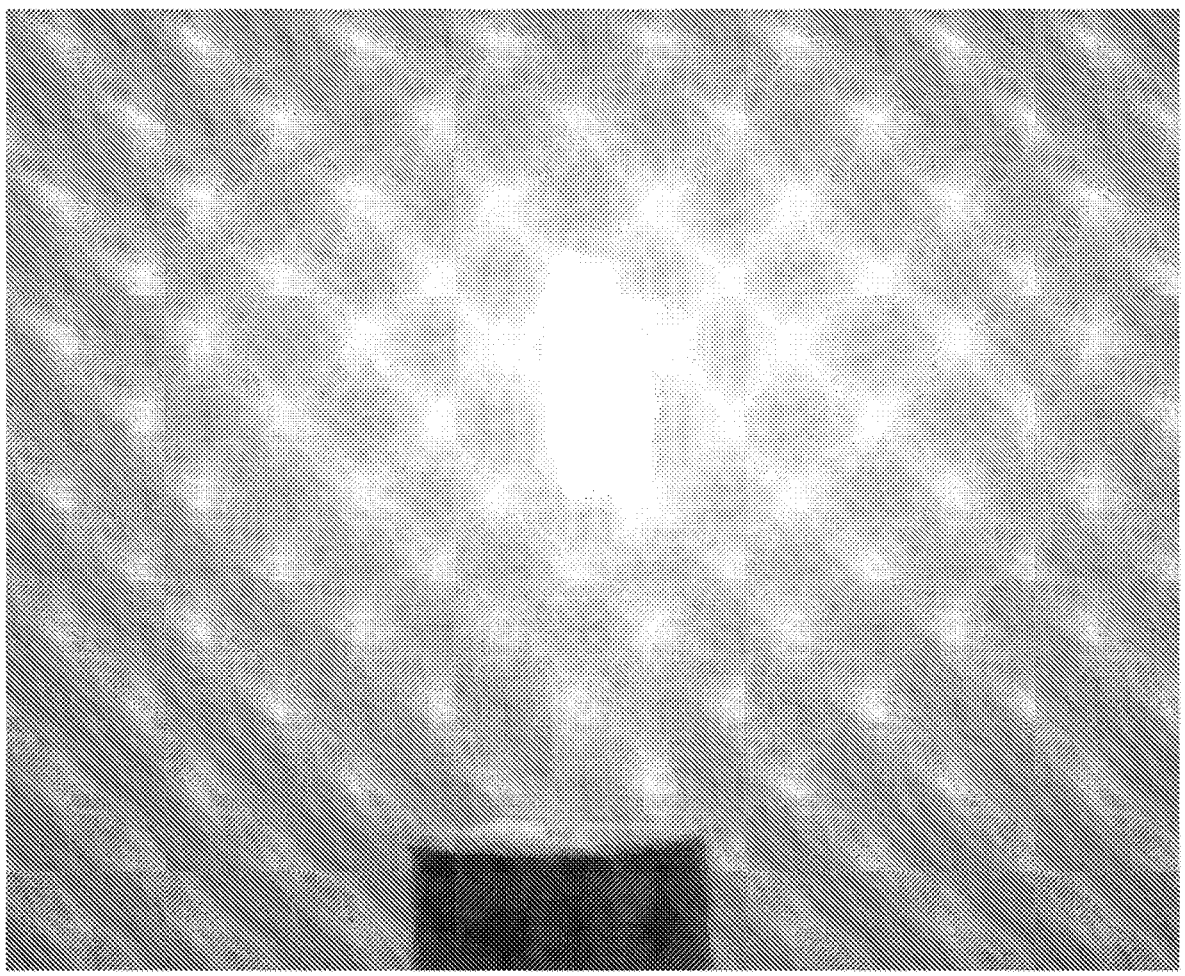
FIG. 19 is an image showing an embodiment's fire-test results.

Regarding FIG. 19, Butane flame with oxygen—+35 mm/Butane MicroTorch Bernzomatic ST 2200

Flame Temperature: 3200° F. (1760° C.)

What is claimed is:

1. A composition consisting essentially of:
   a polycarbonate or polycarbonate-copolymer component having a glass transition temperature of at least 120° C., and
   an additive component having the following elements:
   i) a polyhedral oligomeric silsesquioxane or a mixture of one or more polyhedral oligomeric silsequioxanes, or a combination thereof;
   ii) inorganic particulates with average particle sizes of less than 100 nm;
   iii) a high molecular weight, low volatility primary antioxidant;
   iv) a high molecular weight, low volatility secondary antioxidant; and
   v) a non-halogenated fire retardant or a mixture of one or more non-halogenated fire retardants
   wherein an article molded from the composition has a UL94 VO performance rating at a thickness of 2.0 millimeters; and
   wherein a 0.8 mm thick plaque molded from the composition transmits approximately 0.867 of an 593 nm wavelength measured using a Vasse Ellipsometer or accepted ASTM standards.

2. The composition of claim 1, wherein the polycarbonate or polycarbonate-copolymer component has a glass transition temperature ranging from 140-220° C.

3. The composition of claim 1, wherein the polycarbonate or polycarbonate-copolymer component is present at 88% by weight; and the additive component is present in an amount ranging from 0.1-12.0% by weight.

4. The composition of claim 1, wherein the polycarbonate component is present in an amount ranging from 88-99.9% by weight; and the additive component is present in an amount ranging from 0.1-12.0% by weight.

5. The composition of claim 1, wherein the high molecular weight, low volatility primary antioxidant is 1,3,5-tris (4-t-butyl-3-hydroxy-2,6-dimethylbenzyl)s-triazine-2,4,6-(1H,3H,5H)-trione.

6. The composition of claim 1, wherein the high molecular weight, low volatility secondary antioxidant is bis (2,4-dicumylphenyl) pentaerythrithol diphosphite.

7. A composition consisting essentially of:
   a polycarbonate or polycarbonate-copolymer component having a glass transition temperature of at least 120° C., and
   an additive component having the following elements:
   i) a mixture of saturated and unsaturated fatty esters, a mixture of organic fatty amides with surfactants, a polyhedral oligomeric silsesquioxane or a mixture of one or more polyhedral oligomeric silsequioxanes, or a combination thereof;
   ii) inorganic particulates with average particle sizes of less than 100 nm;
   iii) a high molecular weight, low volatility primary antioxidant;
   iv) a high molecular weight, low volatility secondary antioxidant; and
   v) a non-halogenated fire retardant or a mixture of one or more non-halogenated fire retardants
   wherein an article molded from the composition has a UL94 VO performance rating at a thickness of 2.0 millimeters; and
   wherein a 0.8 mm thick plaque molded from the composition transmits approximately 0.867 of an 593 nm wavelength measured using a Vasse Ellipsometer or accepted ASTM standards.

8. A composition comprising:
   a polycarbonate or polycarbonate-copolymer component having a glass transition temperature of at least 120° C., and
   an additive component having the following elements:
   i) a polyhedral oligomeric silsesquioxane or a mixture of one or more polyhedral oligomeric silsequioxanes, or a combination thereof;
   ii) inorganic particulates with average particle sizes of less than 100 nm;
   iii) a high molecular weight, low volatility primary antioxidant;
   iv) a high molecular weight; low volatility secondary antioxidant; and
   v) a non-halogenated fire retardant or a mixture of one or more non-halogenated fire retardants
   wherein an article molded from the composition has a U VO performance rating at a thickness of 2.0 millimeters; and
   wherein a 0.8 mm thick plaque molded from the composition transmits approximately 0.867 of an 593 nm wavelength measured using a Vasse Ellipsometer or accepted ASTM standards.

* * * * *